(12) United States Patent
Couche et al.

(10) Patent No.: US 12,437,494 B2
(45) Date of Patent: Oct. 7, 2025

(54) SYSTEMS AND METHODS OF CREATING AND EDITING VIRTUAL OBJECTS USING VOXELS

(71) Applicant: Apple Inc., Cupertino, CA (US)

(72) Inventors: Guillaume Couche, London (GB); Jonny Yeo, London (GB); William D. Lindmeier, San Francisco, CA (US); Tony Kobayashi, Berkeley, CA (US)

(73) Assignee: Apple Inc., Cupertino, CA (US)

( * ) Notice: Subject to any disclaimer, the term of this patent is extended or adjusted under 35 U.S.C. 154(b) by 122 days.

(21) Appl. No.: 18/471,850

(22) Filed: Sep. 21, 2023

(65) Prior Publication Data

US 2024/0104876 A1     Mar. 28, 2024

Related U.S. Application Data

(60) Provisional application No. 63/377,030, filed on Sep. 24, 2022.

(51) Int. Cl.
*G06T 19/00*     (2011.01)
*G06T 19/20*     (2011.01)

(52) U.S. Cl.
CPC .................. *G06T 19/20* (2013.01)

(58) Field of Classification Search
CPC ..................................... G06T 19/20
USPC ......................................... 345/420
See application file for complete search history.

(56) References Cited

U.S. PATENT DOCUMENTS 5,015,188 A   5/1991 Pellosie et al.
5,809,267 A   9/1998 Moran et al.
6,167,433 A   12/2000 Maples et al.
6,295,069 B1  9/2001 Shirur
6,426,745 B1  7/2002 Isaacs et al.
6,750,873 B1  6/2004 Bernardini et al.

(Continued)

FOREIGN PATENT DOCUMENTS

EP   3118722 A1   1/2017
GB   2540791 A    2/2017

(Continued)

OTHER PUBLICATIONS

Adding Environments, Available online at: https://manual.keyshot.com/manual/environments/adding-environments/, [retrieved on Jun. 9, 2023], 2 pages.

(Continued)

*Primary Examiner* — Thomas J Lett

(74) *Attorney, Agent, or Firm* — Kubota & Basol LLP

(57) ABSTRACT

A three-dimensional computer-generated environment can be presented to a user. The user can create a virtual representation of a real-world object within the computer-generated environment by directing an input device towards the real-world object and tracing contours of the real-world object. The virtual representation can include voxels. The user can edit the virtual representation or create a new virtual object formed of voxels by depositing or removing voxels at virtual locations within the computer-generated environment based on selection inputs, release inputs, and optionally movement inputs detected by the input device. In some cases, the user can provide inputs via another input source, such as a hand of the user, that are detected by additional sensors or devices.

20 Claims, 23 Drawing Sheets

(56) References Cited

U.S. PATENT DOCUMENTS

| | | |
|---|---|---|
| 7,298,370 B1 | 11/2007 | Middler et al. |
| 9,294,757 B1 | 3/2016 | Lewis et al. |
| 9,298,334 B1 | 3/2016 | Zimmerman et al. |
| 9,383,189 B2 | 7/2016 | Bridges et al. |
| 9,396,580 B1 | 7/2016 | Nowrouzezahrai et al. |
| 9,519,371 B2 | 12/2016 | Nishida |
| 10,488,941 B2 | 11/2019 | Lam et al. |
| 10,642,368 B2 | 5/2020 | Chen |
| 10,664,043 B2 | 5/2020 | Ikuta et al. |
| 10,671,241 B1 | 6/2020 | Jia et al. |
| 10,691,216 B2 | 6/2020 | Geisner et al. |
| 10,762,716 B1 | 9/2020 | Paul et al. |
| 10,846,864 B2 | 11/2020 | Kim et al. |
| 11,138,798 B2 | 10/2021 | Paul et al. |
| 11,204,678 B1 | 12/2021 | Baker et al. |
| 11,249,556 B1 | 2/2022 | Schwarz et al. |
| 11,262,885 B1 | 3/2022 | Burckel |
| 11,340,756 B2 | 5/2022 | Faulkner et al. |
| 11,347,319 B2 | 5/2022 | Goel et al. |
| 11,409,363 B2 | 8/2022 | Chen et al. |
| 11,416,080 B2 | 8/2022 | Heo et al. |
| 11,531,402 B1 | 12/2022 | Stolzenberg |
| 11,531,459 B2 | 12/2022 | Poupyrev et al. |
| 11,557,102 B2 | 1/2023 | Palangie et al. |
| 11,615,596 B2 | 3/2023 | Faulkner et al. |
| 11,641,460 B1 | 5/2023 | Geusz et al. |
| 11,669,155 B2 | 6/2023 | Bowman et al. |
| 11,762,473 B2 | 9/2023 | Cipoletta et al. |
| 11,768,544 B2 | 9/2023 | Schwarz et al. |
| 11,847,748 B2 | 12/2023 | Liu et al. |
| 11,886,643 B2 | 1/2024 | Irie et al. |
| 11,899,845 B2 | 2/2024 | Chung et al. |
| 11,909,453 B2 | 2/2024 | Javaudin et al. |
| 11,914,759 B2 | 2/2024 | Klein et al. |
| 11,928,263 B2 | 3/2024 | Jung et al. |
| 11,983,326 B2 | 5/2024 | Lacey |
| 11,989,965 B2 | 5/2024 | Tarighat Mehrabani |
| 12,032,803 B2 | 7/2024 | Pastrana Vicente et al. |
| 2002/0030692 A1 | 3/2002 | Griesert |
| 2005/0062738 A1 | 3/2005 | Handley et al. |
| 2005/0248299 A1 | 11/2005 | Chemel et al. |
| 2010/0302245 A1 | 12/2010 | Best |
| 2011/0142321 A1 | 6/2011 | Huffman |
| 2012/0113223 A1 | 5/2012 | Hilliges et al. |
| 2012/0170089 A1 | 7/2012 | Kim et al. |
| 2012/0249741 A1 | 10/2012 | Maciocci et al. |
| 2013/0222227 A1 | 8/2013 | Johansson et al. |
| 2013/0321462 A1 | 12/2013 | Salter et al. |
| 2013/0332890 A1 | 12/2013 | Ramic et al. |
| 2014/0040832 A1 | 2/2014 | Regelous |
| 2014/0078176 A1 | 3/2014 | Kim et al. |
| 2014/0129990 A1 | 5/2014 | Xin et al. |
| 2014/0333666 A1 | 11/2014 | Poulos et al. |
| 2014/0368620 A1 | 12/2014 | Li et al. |
| 2015/0067580 A1 | 3/2015 | Um et al. |
| 2015/0121466 A1 | 4/2015 | Brands et al. |
| 2015/0123901 A1 | 5/2015 | Schwesinger et al. |
| 2015/0153833 A1 | 6/2015 | Pinault et al. |
| 2015/0317831 A1 | 11/2015 | Ebstyne et al. |
| 2015/0331576 A1 | 11/2015 | Piya et al. |
| 2016/0098093 A1 | 4/2016 | Cheon et al. |
| 2016/0189426 A1 | 6/2016 | Thomas et al. |
| 2016/0225164 A1 | 8/2016 | Tomlin et al. |
| 2016/0291922 A1 | 10/2016 | Montgomerie et al. |
| 2017/0032568 A1 | 2/2017 | Gharpure et al. |
| 2017/0052595 A1 | 2/2017 | Poulos et al. |
| 2017/0053383 A1 | 2/2017 | Heo |
| 2017/0178392 A1 | 6/2017 | Zuccarino et al. |
| 2017/0213388 A1 | 7/2017 | Margolis et al. |
| 2017/0221264 A1 | 8/2017 | Perry |
| 2017/0243352 A1 | 8/2017 | Kutliroff et al. |
| 2017/0251143 A1 | 8/2017 | Peruch et al. |
| 2017/0270715 A1 | 9/2017 | Lindsay et al. |
| 2017/0287215 A1 | 10/2017 | Lalonde et al. |
| 2017/0287225 A1 | 10/2017 | Powderly et al. |
| 2017/0351094 A1 | 12/2017 | Poulos et al. |
| 2018/0005433 A1 | 1/2018 | Kohler et al. |
| 2018/0088787 A1 | 3/2018 | Bereza et al. |
| 2018/0103209 A1 | 4/2018 | Fischler et al. |
| 2018/0122138 A1 | 5/2018 | Piya et al. |
| 2018/0130255 A1 | 5/2018 | Hazeghi et al. |
| 2018/0143693 A1 | 5/2018 | Calabrese et al. |
| 2018/0173404 A1 | 6/2018 | Smith |
| 2018/0197341 A1 | 7/2018 | Loberg et al. |
| 2018/0348986 A1 | 12/2018 | Sawaki |
| 2019/0018479 A1 | 1/2019 | Minami |
| 2019/0018498 A1 | 1/2019 | West et al. |
| 2019/0050062 A1 | 2/2019 | Chen et al. |
| 2019/0130622 A1 | 5/2019 | Hoover et al. |
| 2019/0155495 A1 | 5/2019 | Klein et al. |
| 2019/0164340 A1 | 5/2019 | Pejic et al. |
| 2019/0228589 A1 | 7/2019 | Dascola et al. |
| 2019/0340832 A1 | 11/2019 | Srinivasan et al. |
| 2019/0349575 A1 | 11/2019 | Knepper et al. |
| 2019/0362557 A1 | 11/2019 | Lacey et al. |
| 2020/0005539 A1 | 1/2020 | Hwang et al. |
| 2020/0045249 A1 | 2/2020 | Francois et al. |
| 2020/0048825 A1 | 2/2020 | Schultz et al. |
| 2020/0128227 A1 | 4/2020 | Chavez et al. |
| 2020/0135141 A1 | 4/2020 | Day et al. |
| 2020/0214682 A1 | 7/2020 | Zaslavsky et al. |
| 2020/0286299 A1 | 9/2020 | Wang et al. |
| 2020/0379626 A1 | 12/2020 | Guyomard et al. |
| 2021/0034163 A1 | 2/2021 | Goel et al. |
| 2021/0034319 A1 | 2/2021 | Wang et al. |
| 2021/0132687 A1* | 5/2021 | Luo ................. G06F 3/011 |
| 2021/0225043 A1 | 7/2021 | Tang et al. |
| 2021/0241483 A1 | 8/2021 | Dryer et al. |
| 2021/0279967 A1 | 9/2021 | Gernoth et al. |
| 2021/0295592 A1 | 9/2021 | Von Cramon |
| 2021/0374221 A1 | 12/2021 | Markhasin et al. |
| 2021/0383097 A1 | 12/2021 | Guerard et al. |
| 2022/0083145 A1 | 3/2022 | Matsunaga et al. |
| 2022/0084279 A1 | 3/2022 | Lindmeier et al. |
| 2022/0121344 A1 | 4/2022 | Pastrana Vicente et al. |
| 2022/0148257 A1 | 5/2022 | Boubekeur et al. |
| 2022/0253136 A1 | 8/2022 | Holder et al. |
| 2022/0277533 A1* | 9/2022 | Park ................. G06Q 50/16 |
| 2022/0317776 A1 | 10/2022 | Sundstrom et al. |
| 2022/0326837 A1 | 10/2022 | Dessero et al. |
| 2022/0335697 A1 | 10/2022 | Harding et al. |
| 2022/0382385 A1 | 12/2022 | Chen et al. |
| 2022/0397962 A1 | 12/2022 | Goel et al. |
| 2022/0408164 A1 | 12/2022 | Lee et al. |
| 2022/0413691 A1 | 12/2022 | Becker et al. |
| 2022/0414975 A1 | 12/2022 | Becker et al. |
| 2022/0415094 A1 | 12/2022 | Kim et al. |
| 2023/0027040 A1 | 1/2023 | Wang et al. |
| 2023/0030699 A1 | 2/2023 | Zion et al. |
| 2023/0031832 A1 | 2/2023 | Lipton et al. |
| 2023/0032771 A1 | 2/2023 | Zion et al. |
| 2023/0076326 A1 | 3/2023 | Xu et al. |
| 2023/0103161 A1 | 3/2023 | Li et al. |
| 2023/0119162 A1 | 4/2023 | Lipton et al. |
| 2023/0152935 A1 | 5/2023 | Mckenzie et al. |
| 2023/0168745 A1 | 6/2023 | Yoda |
| 2023/0236660 A1* | 7/2023 | Kundu ................. G06T 13/40 |
| | | 345/156 |
| 2023/0290042 A1 | 9/2023 | Casella et al. |
| 2023/0377259 A1 | 11/2023 | Becker et al. |
| 2023/0377299 A1 | 11/2023 | Becker et al. |
| 2023/0377300 A1 | 11/2023 | Becker et al. |
| 2024/0037886 A1 | 2/2024 | Chiu et al. |
| 2024/0103636 A1 | 3/2024 | Lindmeier et al. |
| 2024/0104875 A1 | 3/2024 | Couche et al. |
| 2024/0233097 A1 | 7/2024 | Ngo et al. |

FOREIGN PATENT DOCUMENTS

| | | |
|---|---|---|
| KR | 10-2014-0097654 A | 8/2014 |
| KR | 10-2017-0027240 A | 3/2017 |
| KR | 10-2018-0102171 A | 9/2018 |
| KR | 10-2020-0110788 A | 9/2020 |
| KR | 10-2020-0135496 A | 12/2020 |

(56) References Cited

FOREIGN PATENT DOCUMENTS

| WO | 2019/172678 A1 | 9/2019 |
|---|---|---|
| WO | 2019/213111 A1 | 11/2019 |
| WO | 2022/147146 A1 | 7/2022 |

OTHER PUBLICATIONS

Area Light, Available online at: https://manual.keyshot.com/manual/materials/material-types/light-sources/area-light/, [retrieved on Jun. 9, 2023], 24 pages.
Artec Leo Full 3D Scanning Demo w/ Sample Data, Digitize Designs, LLC, Available online at: <https://www.youtube.com/watch?v=ecBKo_h3Pug>, [retrieved on Sep. 1, 2022], Feb. 22, 2019, 3 pages.
Ex Parte Quayle Action received for U.S. Appl. No. 17/655,347, mailed on Jul. 8, 2024, 6 pages.
Feature Highlights, Available online at: https://manual.keyshot.com/manual/whats-new/feature-highlights/, [retrieved on Jun. 9, 2023], 28 pages.
Final Office Action received for U.S. Appl. No. 17/469,788, mailed on Nov. 16, 2023, 24 pages.
Final Office Action received for U.S. Appl. No. 17/807,226, mailed on Nov. 30, 2023, 23 pages.
Final Office Action received for U.S. Appl. No. 17/812,965, mailed on Jan. 31, 2024, 9 pages.
Final Office Action received for U.S. Appl. No. 17/814,462, mailed on Nov. 1, 2024, 44 pages.
International Search Report received for PCT Patent Application No. PCT/US2021/049520, mailed on Apr. 8, 2022, 8 pages.
International Search Report received for PCT Patent Application No. PCT/US2022/071208, mailed on Aug. 18, 2022, 9 pages.
International Search Report received for PCT Patent Application No. PCT/US2023/074955, mailed on Feb. 1, 2024, 6 pages.
Light Manager, Available online at: https://manual.keyshot.com/manual/lighting/lighting-manager/, [retrieved on Jun. 9, 2023], 3 pages.
Non-Final Office Action received for U.S. Appl. No. 17/469,788, mailed on Mar. 2, 2023, 22 pages.
Non-Final Office Action received for U.S. Appl. No. 17/469,788, mailed on Mar. 21, 2024, 24 pages.
Non-Final Office Action received for U.S. Appl. No. 17/807,226, mailed on Jun. 26, 2023, 21 pages.
Non-Final Office Action received for U.S. Appl. No. 17/812,965, mailed on Jun. 8, 2023, 8 pages.
Non-Final Office Action received for U.S. Appl. No. 17/814,455, mailed on Feb. 16, 2024, 24 pages.
Non-Final Office Action received for U.S. Appl. No. 17/814,462, mailed on Feb. 1, 2024, 30 pages.
Non-Final Office Action received for U.S. Appl. No. 17/905,483, mailed on Mar. 27, 2024, 16 pages.
Non-Final Office Action received for U.S. Appl. No. 18/317,893, mailed on Apr. 25, 2024, 18 pages.
Notice of Allowance received for U.S. Appl. No. 17/469,788, mailed on Oct. 15, 2024, 7 pages.
Notice of Allowance received for U.S. Appl. No. 17/655,347, mailed on Oct. 9, 2024, 7 pages.
Notice of Allowance received for U.S. Appl. No. 17/807,226, mailed on Jul. 3, 2024, 9 pages.
Notice of Allowance received for U.S. Appl. No. 17/807,236, mailed on Feb. 5, 2024, 13 pages.
Notice of Allowance received for U.S. Appl. No. 17/807,236, mailed on Jul. 10, 2024, 9 pages.
Notice of Allowance received for U.S. Appl. No. 17/812,965, mailed on Jul. 26, 2024, 6 pages.
Notice of Allowance received for U.S. Appl. No. 17/812,965, mailed on Nov. 15, 2024, 6 pages.
Notice of Allowance received for U.S. Appl. No. 17/814,455, mailed on Oct. 7, 2024, 10 pages.
Notice of Allowance received for U.S. Appl. No. 18/317,893, mailed on Mar. 6, 2024, 8 pages.
Notice of Allowance received for U.S. Appl. No. 18/317,893, mailed on Nov. 22, 2023, 9 pages.
Notice of Allowance received for U.S. Appl. No. 18/473,180, mailed on Aug. 22, 2024, 13 pages.
Restriction Requirement received for U.S. Appl. No. 17/905,483, mailed on Dec. 7, 2023, 7 pages.
Search Report received for United Kingdom Patent Application No. GB2210885.6, mailed on Jan. 27, 2023, 1 page.
Cas and Chary XR, Oculus Go & Your Phone as 2nd Controller!!—An Inexpensive Way to Play PC VR Games, posted on Mar. 8, 2019, https://www.youtube.com/watch?v=i_iRVa0kemw, 2019, 4 pages.
Gamedbharat, I Want to Rotate a Object on Double Tap, Can Any One Help Me With This?, posted on Jul. 26, 2017, https://discussions.unity.com/t/i-want-to-rotate-a-object-on-double-tap-can-any-one-help-me-with-this/192010, 2017, 3 pages.
Locher, et al., Mobile Phone and Cloud—a Dream Team for 3D Reconstruction, 2016 IEEE Winter Conference on Applications of Computer Vision (WACV), 2016, pp. 1-8.
Ro, et al., AR Pointer: Advanced Ray-Casting Interface Using Laser Pointer Metaphor for Object Manipulation in 3D Augmented Reality Environment, Applied Sciences, vol. 9, No. 3078, [retrieved on Jul. 27, 2020], Jul. 30, 2019, 18 pages.
Slambekova, Dana, Gaze and Gesture Based Object Interaction in Virtual World, [retrieved on Dec. 17, 2015]. Retrieved from the Internet: <URL:https://www.cs.rit.edu/~dxs4659/Report.pdf>, May 31, 2012, 54 pages.
"Kitasenju Design", X [online]. X Corp. 2024 [retrieved on Apr. 25, 2024]. Retrieved from the Internet: <URL: https://twitter.com/kitasenjudesign/status/1282665402812608513>.
"Voxelize", Rossiev [online]. Denis Rossiev 2018-2024 [retrieved on Apr. 25, 2024]. Retrieved from the Internet: <URL: https://www.rossiev.pro/voxelize/>.
"Voxel World Lens", Snapchat [online]. Snapchat Inc. 2024 [retrieved on Apr. 25, 2024]. Retrieved from the Internet: <URL: https://www.snapchat.com/lens/689751dd6a7d446280d903d15d79f104?locale=en-US>.
"Artec Leo", Artec 3D [online]. Artect Europe 2024 [retrieved on Apr. 25, 2024]. Retrieved from the Internet: <URL: https://artec3d.com/portable-3d-scanners/artec-leo>.
"POP 2 3D Scanner (Infrared Light | Precision 0.05mm)", REVPOINT [online]. Revopoint 3D 2024 [retrieved on Apr. 25, 2024]. Retrieved from the Internet: <URL: https://global.revopoint3d.com/products/face-3d-scanner-pop2?_ga=2.182721893.277596832.1650264227-586470518.1640327512&ref=dh0L07OOzRuqo&utm_campaign=pop2_banner&utm_medium=referral&utm_source=Official_Website>.
"Open Source Voxel Editor for Windows, Mac, Linux, iOS, and Android", Goxel [online]. Goxel by Guillaume Chereau 2019 [retrieved on Apr. 25, 2024]. Retrieved from the Internet: <URL: https://goxel.xyz/>.
"VoxEdit Beta Tutorial—Introduction and How to Animate Voxel Creations", YouTube [online]. Google LLC 2024 [retrieved on Apr. 25, 2024]. Retrieved from the Internet: <URL: https://www.youtube.com/watch?v=fqcArJWtyqM>.
"MagicaVoxel 0.99.5 Review", YouTube [online]. Google LLC 2024 [retrieved on Apr. 25, 2024]. Retrieved from the Internet: <URL: https://www.youtube.com/watch?v=WPPFnHQWwFk>.
"ShareVOX", Phoria [online]. Phoria Pty Ltd 2024 [retrieved on Apr. 25, 2024]. Retrieved from the Internet: <URL: https://www.phoria.com.au/projects/sharevox/>.
"Curious Blocks Alternatives 12", progsoft [online]. Profsoft 2024 [retrieved on Apr. 25, 2024]. Retrieved from the Internet: <URL: https://progsoft.net/en/software/curious-blocks>.
Qi, Charles R. et al. "PointNet++: Deep Hierarchical Feature Learning on Point Sets in a Metric Space", Stanford University, Jun. 7, 2017. 14 pages.
Strand, Robin, "Surface skeletons in grids with non-cubic voxels", 2004 IEEE Xplore, Sep. 2004. <DOI: 10.1109/ICPR.2004.1334195>, 5 pages.

* cited by examiner

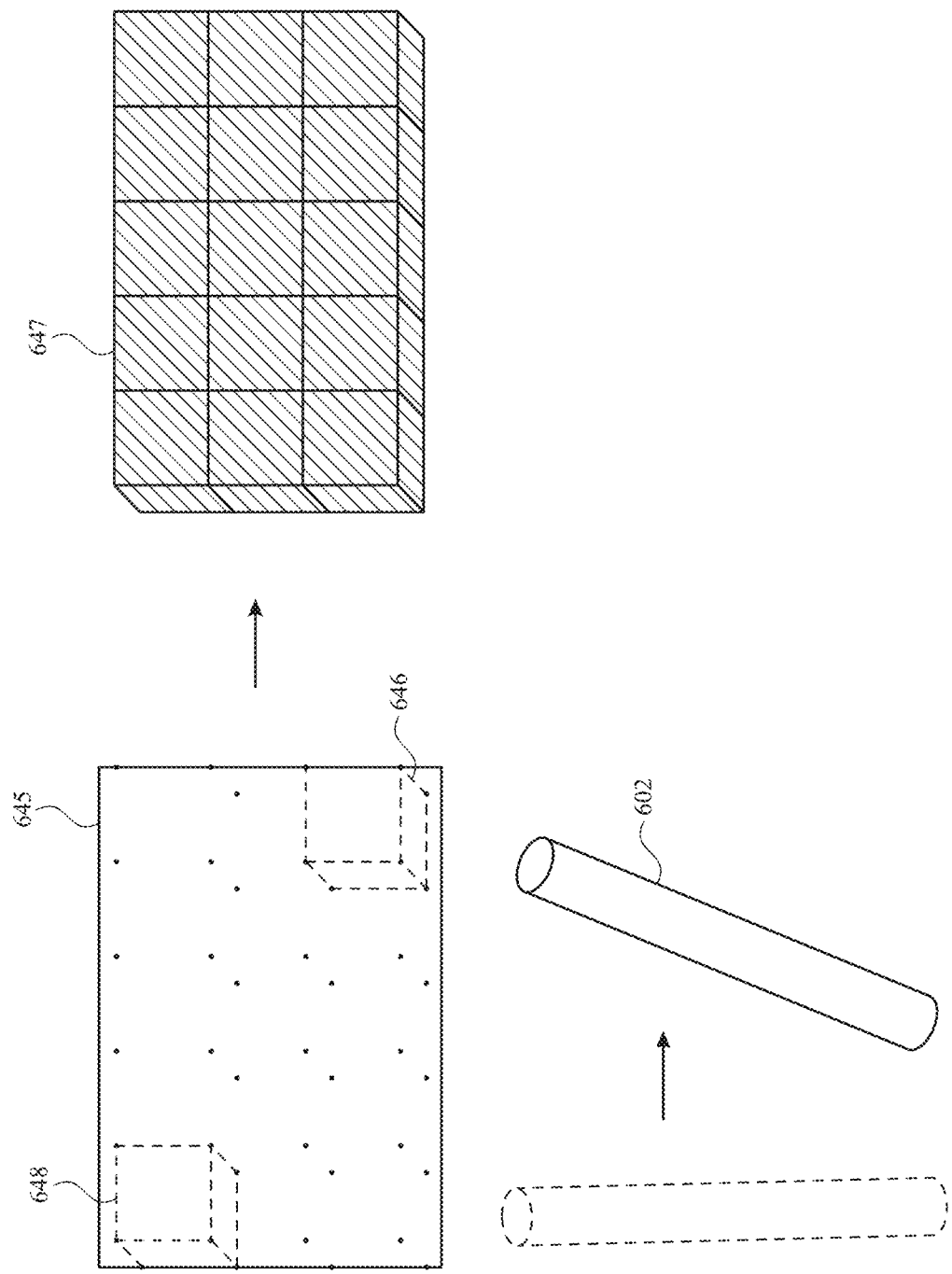

SYSTEMS AND METHODS OF CREATING AND EDITING VIRTUAL OBJECTS USING VOXELS

CROSS-REFERENCE TO RELATED APPLICATIONS

This application claims the benefit of U.S. Provisional Application No. 63/377,030, filed Sep. 24, 2022, the content of which is herein incorporated by reference in its entirety for all purposes.

FIELD OF THE DISCLOSURE

This relates generally to computer systems, methods, and user interfaces that enable creation and editing of virtual objects using voxels.

BACKGROUND OF THE DISCLOSURE

Computer-generated environments are environments where at least some objects displayed for a user's viewing are generated using a computer. A user may wish to construct three-dimensional virtual objects within the computer-generated environment. However, constructing three-dimensional virtual objects in such environments can be complex and time consuming.

SUMMARY OF THE DISCLOSURE

In some examples, a voxel representation can be created in a computer-generated environment based on sampling at least a portion of a real-world object. In some examples, the real-world object can be sampled to create the voxel representation based on an input device (e.g., smartphone or other handheld device) directed towards the real-world object and tracing contours of the real-world object. In some examples, the voxel representation can be modified after creation based on depositing or removing voxels at virtual locations within the computer-generated environment.

BRIEF DESCRIPTION OF THE DRAWINGS

FIG. 3K illustrates a voxel representation that includes a respective voxel with a position offset by a predefined or varying amount in accordance with some examples of the disclosure.

FIGS. 6A-6H illustrate exemplary techniques for creating and editing virtual objects using voxels in accordance with some examples of the disclosure.

DETAILED DESCRIPTION

Figure 1:
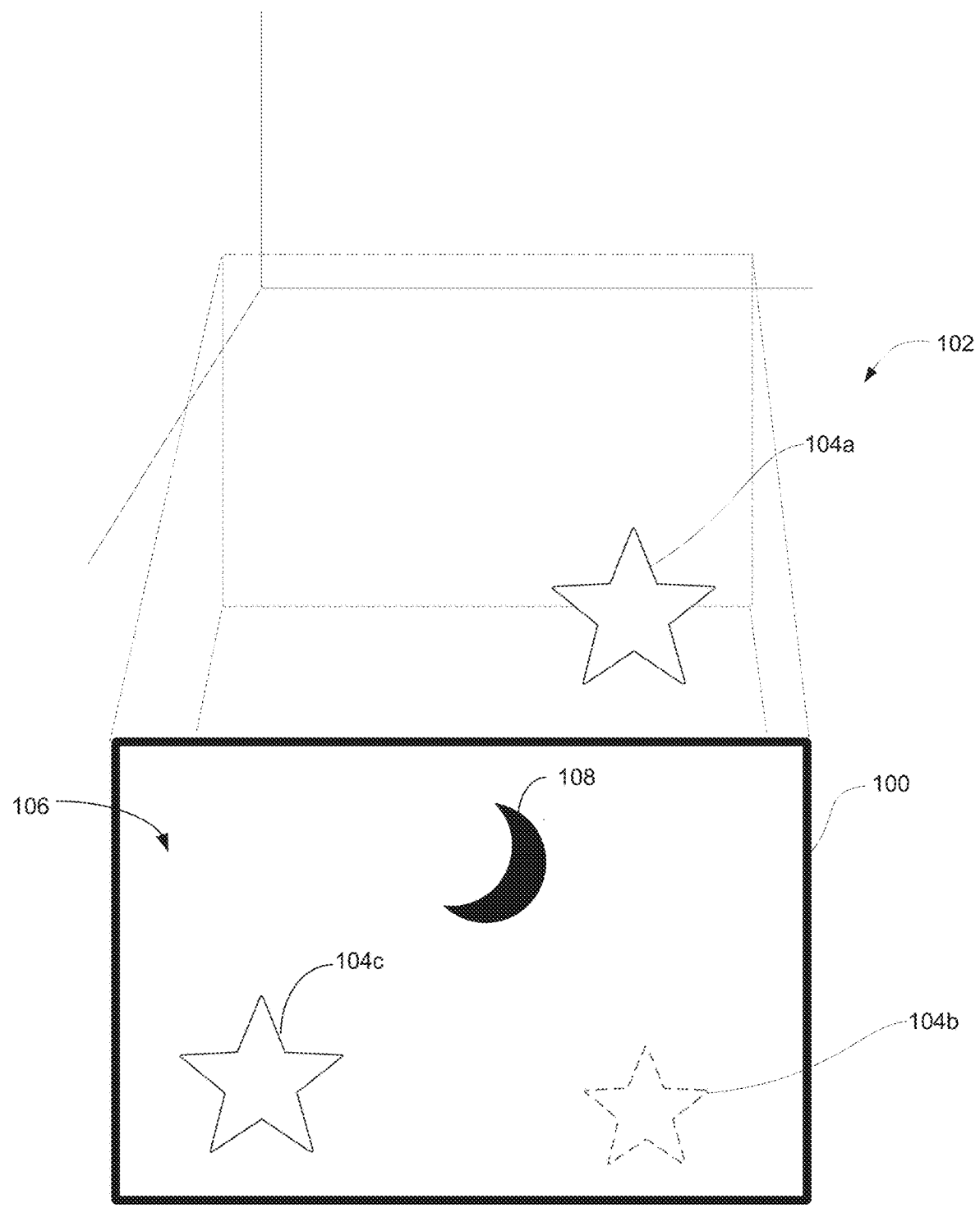
FIG. 1 illustrates an electronic device displaying a computer-generated environment according to some examples of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some examples described in this disclosure are directed to devices, methods, and graphical user interfaces for generating, updating, and/or presenting three-dimensional virtual objects in a computer-generated environment. Creating virtual objects (e.g., three-dimensional virtual objects) from scratch can be complex and time consuming, especially for beginners. To simplify creation of virtual objects, a voxel representation can be created in the three-dimensional environments. As described herein, a voxel representation includes a plurality of geometric three-dimensional voxels that represent a real-world object in the three-dimensional environment.

In some examples, in a first operating mode, a voxel representation can be generated from real-world objects in a user's environment instead of building the voxel representation from scratch. For example, a system optionally detects one or more real-world objects (e.g., sampling of the real-world object(s)) and automatically generates a voxel representation corresponding to the one or more real-world objects (or portions thereof). Although primarily described in the context of real-world objects, it is understood that voxel representations of virtual objects (e.g., non-voxel representations) can also be automatically generated (e.g., sampling of the virtual object(s)).

In some examples, in the first operating mode, a voxel representation of an entire three-dimensional environment can be generated. In some examples, a user can generate a voxel representation of portions of the three-dimensional environment. Providing the user with control to generate voxel representations of portions of the environment can be used to quickly, easily, and intuitively generate a three-dimensional representation of one or more objects or a portion thereof.

In some examples, an electronic device can detect a real-world object in a three-dimensional environment based on an input device directed towards the real-world object (e.g., directly or indirectly targeting the real-world object), directed towards a portion of a real-world object, or generally directed towards a portion of the three-dimensional environment presented to the user (e.g., including one or more objects or portions thereof). Upon receiving input requesting generation of a voxel representation of at least a portion of the real-world object, the electronic device can create the voxel representation including a first plurality of voxels corresponding to at least the portion of the real-world object based on the input.

In some examples, in a second operating mode, a user may wish to edit a virtual object that has been created in the computer-generated three-dimensional environment (such as a voxel representation created as using techniques described above), or to create a new virtual object in the three-dimensional environment. In some examples, the user may use an input device to generate and/or edit virtual objects formed of voxels. The input device optionally includes a user's hand and/or a pointer device (e.g., a stylus or stylus like device), among other possibilities. In some examples, the input device(s) described herein may be represented within the computer-generated environment as a virtual input device. In some examples, the user may use the input device (optionally controlling a virtual input device within the computer-generated environment) to generate and/or edit virtual objects formed of voxels.

In some examples, for editing and building a voxel representation, the user may be presented with a user interface including one or more user interface elements representing preview voxels (e.g., sample voxels having various shapes, colors, and/or textures) in the computer-generated environment. The user may use the input device to select one of the interface elements from the user interface as the preview voxel. The user may then generate a virtual object by using the input device to deposit voxels corresponding to the preview voxel (e.g., voxels having the same visual characteristics as the preview voxel).

In some examples, the system may detect user inputs with an input device (and optionally thereby cause the virtual device to move within the computer-generated environment). In some examples, the user may move the input device to indicate (e.g., point to) virtual locations where voxels are to be deposited to form the virtual object, or to indicate voxels to be removed from a virtual object. As described herein, the user may provide additional inputs to cause the virtual object to be rotated, moved, scaled, or otherwise transformed within the computer-generated environment. In some examples, such additional inputs may be made with a different input device (e.g., gestures using a hand such as the user's off hand; that is, the hand that is not holding the pointing device).

FIG. 1 illustrates an electronic device 100 according to some examples of the disclosure. In some examples, the electronic device 100 is a portable electronic device, such as a tablet computer, laptop computer, a smartphone, or another device including a display generation component. Example architectures of electronic device 100 are described below with reference to the block diagrams of FIGS. 2A-2B. FIG. 1 illustrates a physical environment 102 include a real-world object 104a. As shown in FIG. 1, the electronic device 100 in physical environment 102 is presenting a three-dimensional environment (e.g., a computer-generated environment) 106 that optionally includes one or more real-world objects (e.g., using a transparent display), one or more representations of real objects (e.g., using images capturing the real-world object(s)), and/or one or more virtual objects. In some examples, the electronic device 100 presents at least a portion of the three-dimensional environment 106 (e.g., including the virtual objects) in response to one or more inputs.

In some examples, the electronic device 100 displays a virtual object, such as virtual object 108, that are not represented in the physical environment 102. For example, the electronic device 100 displays the virtual object 108 (e.g., a virtual moon) without a real-world object (e.g., a real-world moon) corresponding to the virtual object 108 in the physical environment 102. In some examples, the electronic device 100 presents the physical environment 102 including a real-world object 104a. In some examples, electronic device 100 captures one or more images of the physical environment 102 around the electronic device 100 and displays representations of the physical environment 102 include a representation of real-world object 104a, in the three-dimensional environment. For example, the electronic device presents a representation 104b corresponding to real-world object 104a (e.g., an image capture of real-world object 104a).

In some examples, the electronic device 100 displays in the three-dimensional environment, real and virtual content together. For example, real-world object 104a (e.g., a real-world star) or a representation 104b of real-world object 104a (e.g., a representation of a real-world star) are shown together with the virtual content (e.g., virtual objects 104c and 108). As described herein, some of the virtual objects presented to the user are representations of real-world objects. For example, as illustrated, the electronic device 100 presents the representation 104b of the real-world object 104a (e.g., a representation of a real-world star) as well as the virtual object 104c (e.g., a virtual star) based on the real-world object 104a. In some examples, as described herein, a virtual object 104c corresponds to a voxel representation of real-world object 104a (or representation of real-world object 104a), optionally generated using the techniques described with reference to FIGS. 3A-5D and 7. Additionally, in some examples, as described herein, a voxel representation can be created (e.g., built) from scratch. For example, virtual object 108 corresponds to a voxel representation built from scratch using the techniques described with reference to FIGS. 6A-6H and 8 or corresponds to a voxel representation generated using the techniques described with reference to FIGS. 3A-5D and 7 and edited using the techniques described with reference to FIGS. 6A-6H and 8.

In some examples, the three-dimensional environment optionally recreates portions of physical environment 102 such that the three-dimensional environment appears to the user of the electronic device 100 as if the user is physically located in physical environment 102 (e.g., optionally from the perspective of the user's current location in the physical environment and in direction that the user is currently facing). In some examples, while the electronic device 100 presents, in the three-dimensional environment, one or more other virtual objects (e.g., application user interface, operating system elements, representation of users of other electronic devices, representation of content items, etc.). In some examples, the other virtual objects include user interfaces for generating, editing, and/or manipulating voxel representations, as described in more detail herein.

Figure 2A:
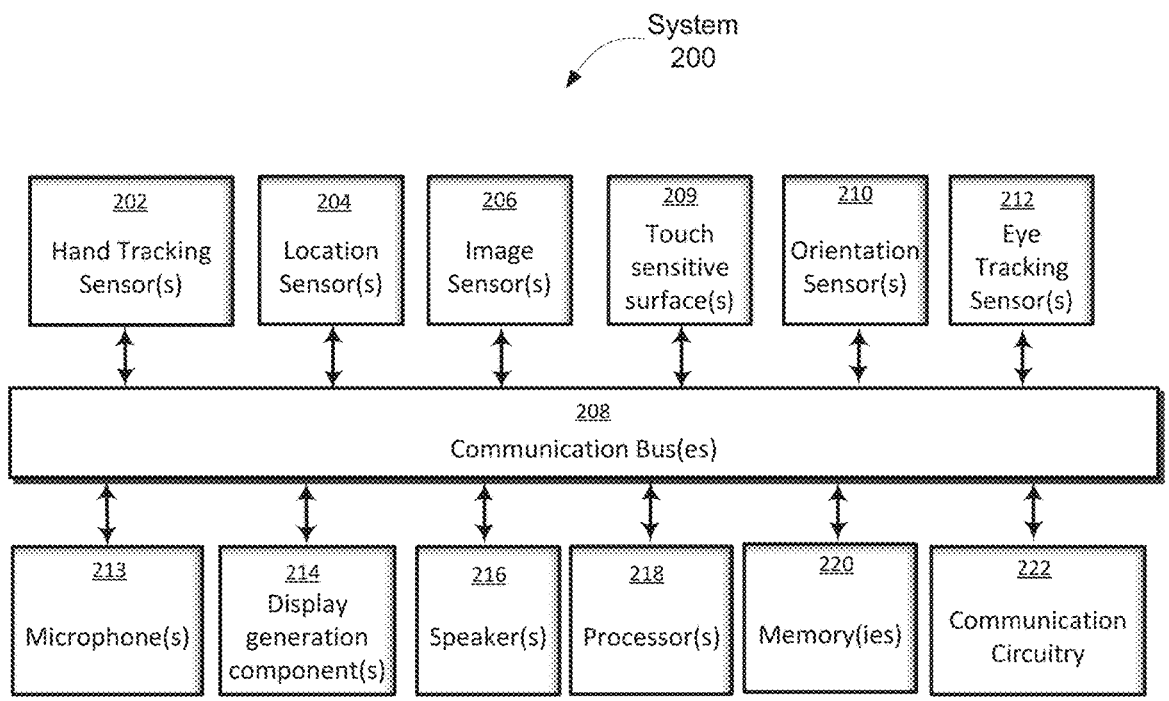
FIGS. 2A-2B illustrate example block diagrams of architectures for a system or device in accordance with some examples of the disclosure.
Figure 2B:
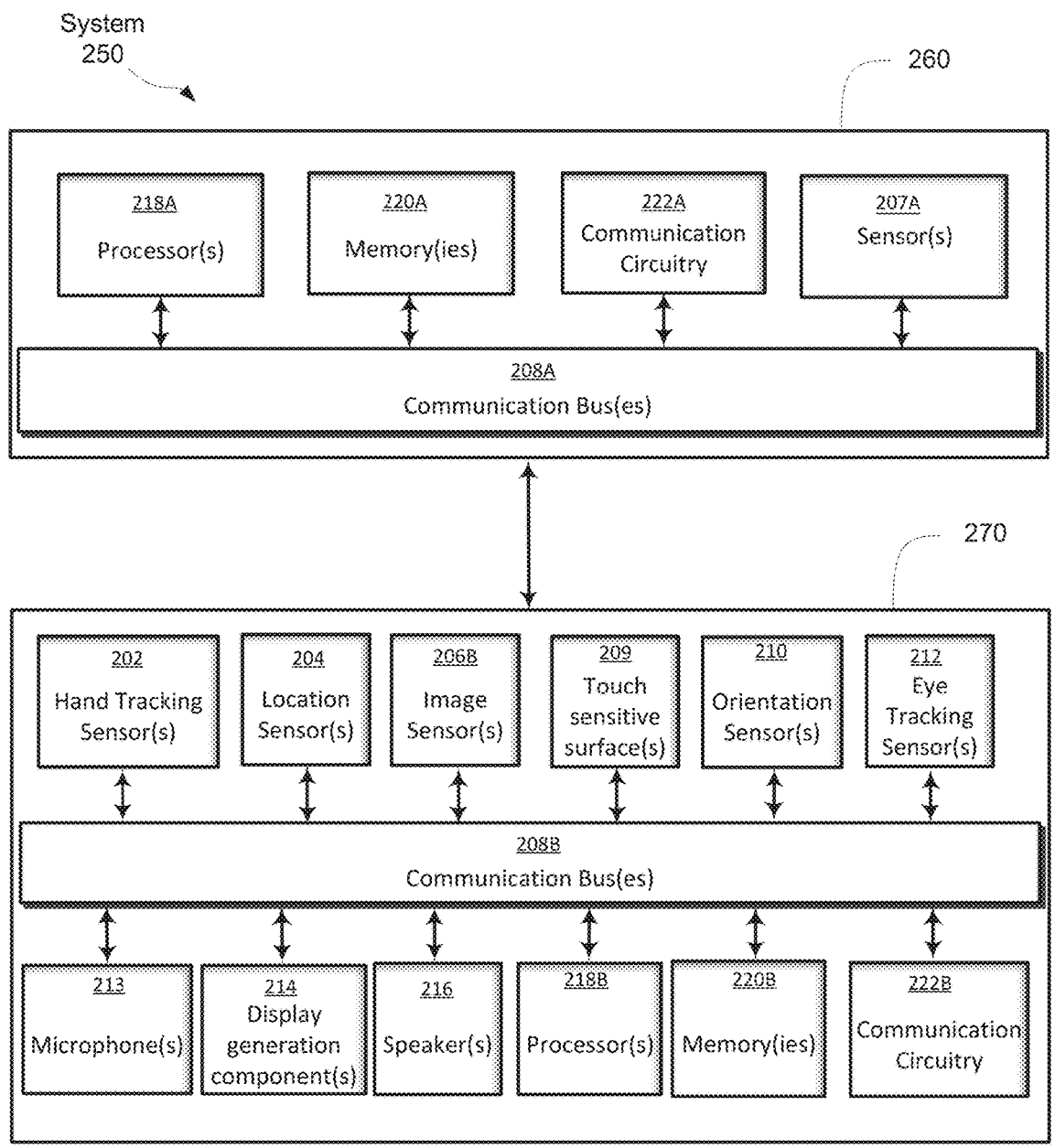

FIGS. 2A-2B illustrate example block diagrams of architectures for a system or device in accordance with some examples of the disclosure. In some examples, device 200 is a portable device, such as a mobile phone, smart phone, a tablet computer, a laptop computer, an auxiliary device in communication with another device, etc. As illustrated in FIG. 2A, device 200 optionally includes various sensors (e.g., one or more hand tracking sensor(s) 202, one or more location sensor(s) 204, one or more image sensor(s) 206, one or more touch-sensitive surface(s) 209, one or more motion and/or orientation sensor(s) 210, one or more eye tracking sensor(s) 212, one or more microphone(s) 213 or other audio sensors, etc.), one or more display generation component(s) 214, one or more speaker(s) 216, one or more processor(s) 218, one or more memories 220, and/or communication circuitry 222. One or more communication buses 208 are optionally used for communication between the above-mentioned components of device 200.

Communication circuitry 222 optionally includes circuitry for communicating with electronic devices, networks, such as the Internet, intranets, a wired network and/or a wireless network, cellular networks and wireless local area networks (LANs). Communication circuitry 222 optionally includes circuitry for communicating using near-field communication (NFC) and/or short-range communication, such as Bluetooth®.

Processor(s) 218 optionally include one or more general purpose processors, one or more graphics processors, and/or one or more digital signal processors (DSPs). In some examples, memory 220 is a non-transitory computer-readable storage medium (e.g., flash memory, random access memory, or other volatile or non-volatile memory or storage) that stores computer-readable instructions configured to be executed by processor(s) 218 to perform the techniques, processes, and/or methods described below. In some examples, memories 220 include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

Display generation component(s) 214 optionally include a single display (e.g., a liquid-crystal display (LCD), organic light-emitting diode (OLED), or other types of display). In some examples, display generation component(s) 214 include multiple displays. In some examples, display generation component(s) 214 includes a display with a touch-sensitive surface (e.g., a touch screen), a projector, a holographic projector, a retinal projector, etc.

In some examples, device 200 includes touch-sensitive surface(s) 209 configured to receive user inputs (touch and/or proximity inputs), such as tap inputs and swipe inputs or other gestures. In some examples, display generation component(s) 214 and touch-sensitive surface(s) 209 together form touch-sensitive display(s) (e.g., a touch screen integrated with device 200 or external to device 200 that is in communication with device 200).

Image sensors(s) 206 optionally include one or more visible light image sensor, such as charged coupled device (CCD) sensors, and/or complementary metal-oxide-semiconductor (CMOS) sensors operable to obtain images of physical objects from the real-world environment. Image sensor(s) 206 optionally include one or more infrared (IR) or near infrared (NIR) sensors, such as a passive or an active IR or NIR sensor, for detecting infrared or near infrared light from the real-world environment. For example, an active IR sensor includes an IR emitter for emitting infrared light into the real-world environment. Image sensor(s) 206 optionally include one or more cameras configured to capture movement of physical objects in the real-world environment. Image sensor(s) 206 optionally include one or more depth sensors configured to detect the distance of physical objects from device 200. In some examples, information from one or more depth sensors can allow the device to identify and differentiate objects in the real-world environment from other objects in the real-world environment. In some examples, one or more depth sensors can allow the device to determine the texture and/or topography of objects in the real-world environment.

In some examples, device 200 uses CCD sensors, event cameras, and depth sensors in combination to detect the physical environment around device 200. In some examples, image sensor(s) 206 include a first image sensor and a second image sensor. The first image sensor and the second image sensor work together and are optionally configured to capture different information of physical objects in the real-world environment. In some examples, the first image sensor is a visible light image sensor, and the second image sensor is a depth sensor. In some examples, device 200 uses image sensor(s) 206 to detect the position and orientation of device 200 and/or display generation component(s) 214 in the real-world environment. For example, device 200 uses image sensor(s) 206 to track the position and orientation of display generation component(s) 214 relative to one or more fixed objects in the real-world environment.

In some examples, device 200 optionally includes hand tracking sensor(s) 202 and/or eye tracking sensor(s) 212. Hand tracking sensor(s) 202 are configured to track the position/location of a user's hands and/or fingers, and/or motions of the user's hands and/or fingers with respect to the computer-generated environment, relative to the display generation component(s) 214, and/or relative to another coordinate system. Eye tracking sensor(s) 212 are configured to track the position and movement of a user's gaze (eyes, face, and/or head, more generally) with respect to the real-world or computer-generated environment and/or relative to the display generation component(s) 214. In some examples, hand tracking sensor(s) 202 and/or eye tracking sensor(s) 212 are implemented together with the display generation component(s) 214 (e.g., in the same device). In some examples, the hand tracking sensor(s) 202 and/or eye tracking sensor(s) 212 are implemented separate from the display generation component(s) 214 (e.g., in a different device).

In some examples, the hand tracking sensor(s) 202 uses image sensor(s) 206 (e.g., one or more IR cameras, 3D cameras, depth cameras, etc.) that capture three-dimensional information from the real-world including one or more hands. In some examples, the hands can be resolved with sufficient resolution to distinguish fingers and their respective positions. In some examples, one or more image sensor(s) 206 are positioned relative to the user to define a field of view of the image sensor(s) and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures) can be advantageous in that it provides an input means that does not require the user to touch or hold a device, and using image sensors allows for tracking without requiring the user to wear a beacon or sensor, etc. on the hands/fingers.

In some examples, eye tracking sensor(s) 212 includes one or more eye tracking cameras (e.g., IR cameras) and/or illumination sources (e.g., IR light sources/LEDs) that emit light towards a user's eyes. Eye tracking cameras may be pointed towards a user's eyes to receive reflected light from the light sources directly or indirectly from the eyes. In some examples, both eyes are tracked separately by respective eye tracking cameras and illumination sources, and a gaze can be determined from tracking both eyes. In some examples, one eye (e.g., a dominant eye) is tracked by a respective eye tracking camera/illumination source(s).

Device 200 optionally includes microphones(s) 213 or other audio sensors. Device 200 uses microphone(s) 213 to detect sound from the user and/or the real-world environment of the user. In some examples, microphone(s) 213 includes an array of microphones that optionally operate together (e.g., to identify ambient noise or to locate the source of sound in space of the real-world environment).

Device 200 optionally includes location sensor(s) 204 configured to detect a location of device 200 and/or of display generation component(s) 214. For example, location sensor(s) 204 optionally includes a GPS receiver that receives data from one or more satellites and allows device 200 to determine the device's absolute position in the physical world.

Device 200 optionally includes motion and/or orientation sensor(s) 210 configured to detect orientation and/or movement of device 200 and/or display generation component(s) 214. For example, device 200 uses orientation sensor(s) 210 to track changes in the position and/or orientation of device 200 and/or display generation component(s) 214 (e.g., with respect to physical objects in the real-world environment). Orientation sensor(s) 210 optionally include one or more gyroscopes, one or more accelerometers, and/or one or more inertial measurement units (IMUs).

It is understood that the architecture of FIG. 2A is an example architecture, but that system/device 200 is not limited to the components and configuration of FIG. 2A. For example, the device/system can include fewer, additional, or other components in the same or different configurations. In some examples, as illustrated in FIG. 2B, system/device 250 can be divided between multiple devices.

In some examples, a first device 260 optionally includes processor(s) 218A, memory or memories 220A, one or more sensor(s) 207A (e.g., motion/orientation sensors, location sensors, touch-sensitive surfaces, image sensors, or other types of sensors), and communication circuitry 222A, optionally communicating over communication bus(es) 208A. In some examples, the first device 260 may be or may include a first input device, such as a stylus or a pointer device.

A second device 270 (e.g., corresponding to device 200) optionally includes various sensors (e.g., one or more hand tracking sensor(s) 202, one or more location sensor(s) 204, one or more image sensor(s) 206 (e.g., RGB camera), one or more touch-sensitive surface(s) 209, one or more motion and/or orientation sensor(s) 210, one or more eye tracking sensor(s) 212, one or more microphone(s) 213 or other audio sensors, etc.), one or more display generation component(s) 214, one or more speaker(s) 216, one or more processor(s) 218B, one or more memories 220B, and/or communication circuitry 222B. One or more communication buses 208B are optionally used for communication between the above-mentioned components of device 270. The details of the components for devices 260 and 270 are similar to the corresponding components discussed above with respect to device 200 and are not repeated here for brevity. First device 260 and second device 270 optionally communicate via a wired or wireless connection (e.g., via communication circuitry 222A-222B) between the two devices. In some examples, the second device may be used as a second input device itself, or may be used to detect inputs from a second input source separate from the first input device, such as a user's hand.

Figure 3A:
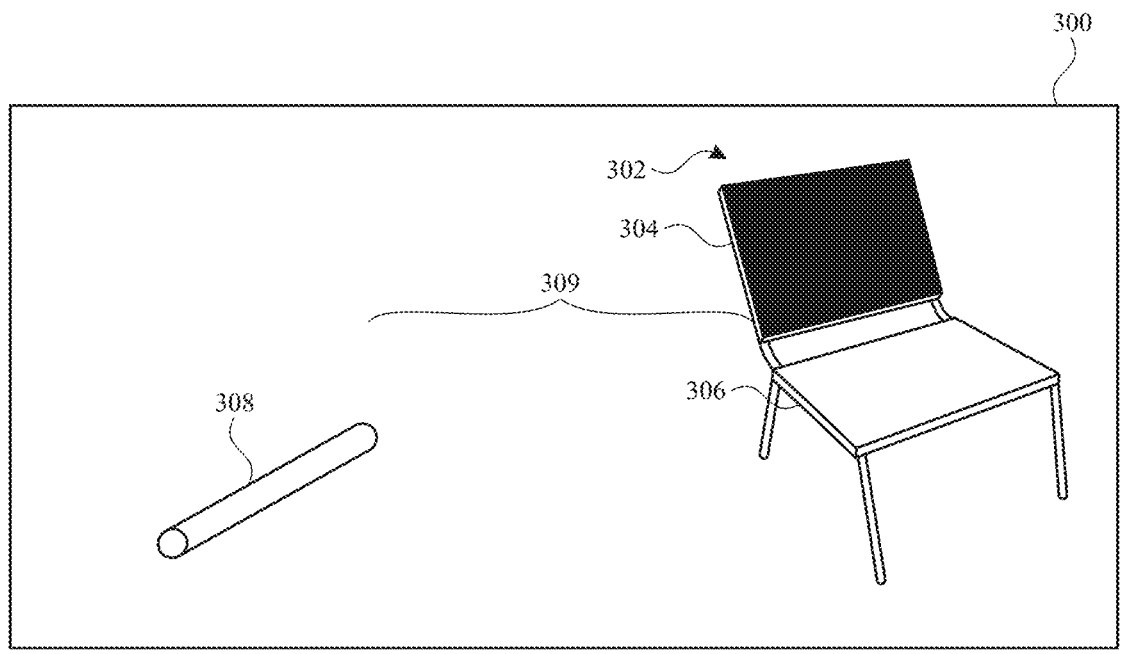
FIGS. 3A-3B illustrate a voxel representation based on an input device directed to a first portion of the real-world object in accordance with some examples of the disclosure.
Figure 3B:
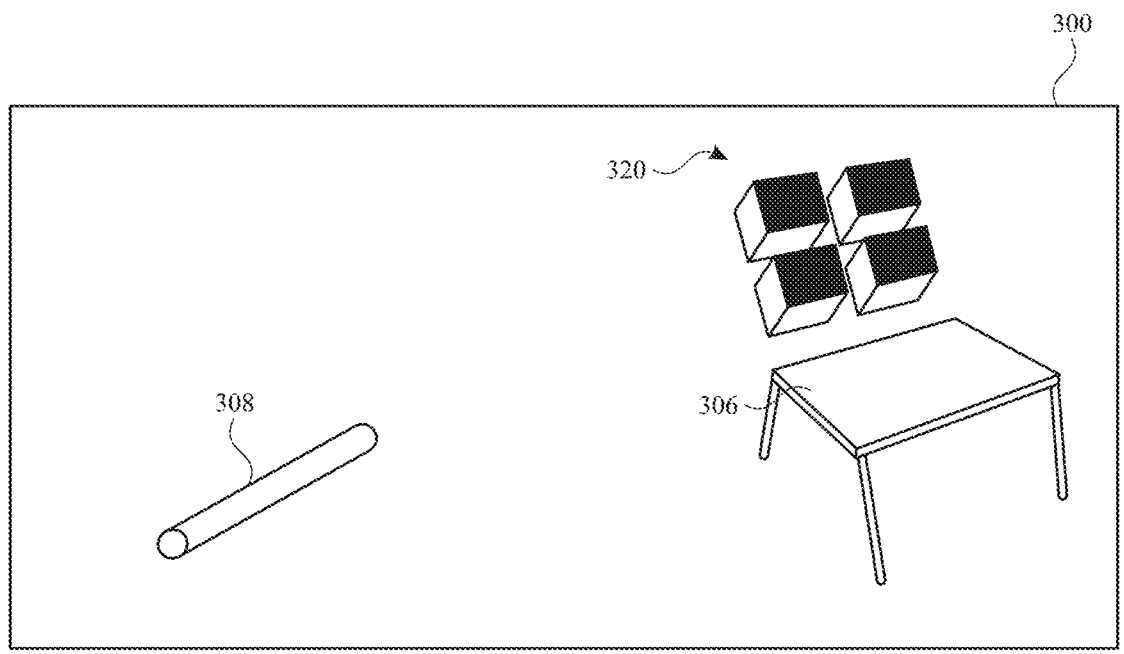
Figure 3C:
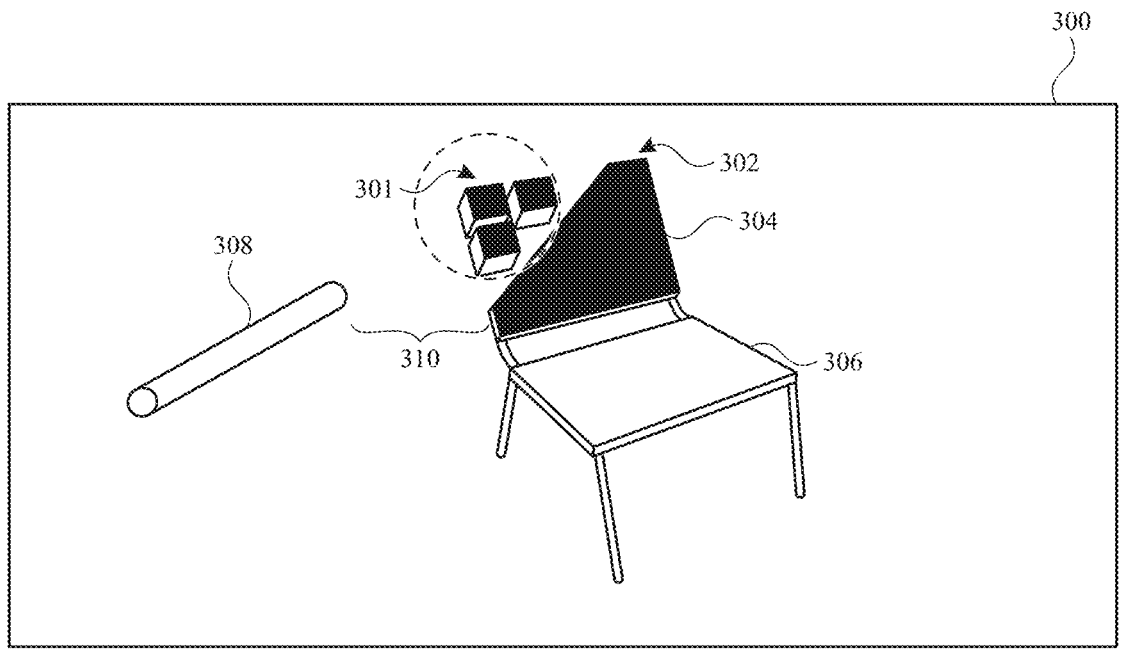
FIG. 3C illustrates a preview of the voxel representation in accordance with some examples of the disclosure.

A computer-generated environment may be displayed using an electronic device (e.g., electronic device 100, device 200, device 250), including using one or more display generation components. The computer-generated environment can optionally include various graphics user interfaces ("GUIs") and/or user interface elements/objects. Attention is now directed towards examples of user interfaces ("UI") and associated processes that may be implemented on a computer system, such as a portable multifunction device or a head-mounted device with a display generation component, one or more input devices, and (optionally) one or more cameras. FIGS. 3A-3C illustrate exemplary ways for generating a virtual object having a material of a real-world object in accordance with some examples of the disclosure.

Although FIG. 2A-2B describe hand tracking using hand tracking sensor(s) 202, it is understood that other input devices can be used. For example, other input devices can be tracked in a similar manner as a hand. Additionally or alternatively, an electronic input device can be used for pointing and/or input sensors for user input, such as gestures. Such input devices are often referred to herein as pointer devices. FIG. 2C illustrates an example electronic input device in accordance with some examples of the disclosure.

In some examples, an input device (and/or a virtual device representing the input device) has a portion (e.g., a first end) representing a pointing direction, such as a tip. As described herein in more detail, in some examples, a user interface element may be presented in proximity to a first end of the input device. The user interface element can move in the three-dimensional computer-generated environment in accordance with movement of the input device. For example, as described herein, in a first operating mode (e.g., corresponding to techniques for generating a voxel representation by sampling a portion of an environment, object(s), and/or portions thereof), a first user interface element is presented at a first distance from a portion (e.g., tip) of a virtual input device in the three-dimensional environment. The user interface element optionally displays (e.g., within the dimensions of the user interface element) a preview of the voxel representation of portions of the three-dimensional computer-generated environment corresponding to the user interface element. Additionally or alternatively, in a second operating mode (e.g., corresponding to techniques for editing or building a virtual object using voxels), a second user interface element is presented at a second distance from a portion (e.g., a first end, a tip) of the virtual input device in the three-dimensional computer-generated environment. The user interface element optionally displays a preview voxel representing the characteristics of the voxel to be added to the three-dimensional environment. Such characteristics may include, for example, color, shape, texture, and/or luminance. In some examples, the first and second distances are the same (e.g., the different user interface elements corresponding to the different modes are presented at the same distance from the first end of the virtual input device). In some examples, the first and second distances are different.

As described herein, in some examples (e.g., in a first operating mode), a voxel representation can be generated from real-world objects in a user's environment instead of building the voxel representation from scratch. For example, a system optionally detects one or more real-world object (e.g., sampling of the real-world object(s)) and automatically generates a voxel representation corresponding to the one or more real-world objects (or portions thereof).

FIGS. 3A-3B illustrate a first voxel representation 320 based on first input device 308 directed to a first portion 304 of a first real-world object 302 in accordance with some examples of the disclosure. FIG. 3A illustrates the first input device 308 (e.g., such as device 260) directed to the first portion 304 of the first real-world object 302 in a three-dimensional environment 300. As illustrated, the first real-world object 302 includes a chair, and the first portion 304 of the first real-world object 302 includes a back of the chair. Further, a second portion 306 of the first real-world object 302 includes a seat of the chair. In FIG. 3A, because the device 200 receives input indicative of the first input device 308 directed towards the back of the chair, the back of the chair is filled with a black color (e.g., emphasized). In some examples, the first input device 308 can include image, motion and/or position sensors indicative of a respective location between the first input device 308 and the real-world object 302 and/or indicative of which real-world object 302 or portion of the real-world object 302 is directed towards. In some examples, information from the image, motion and/or position sensors of the first input device 308 is transmitted to the device 200.

A distance 309 between the first input device 308 and the first portion 304 of a first real-world object 302 is outside a threshold distance (e.g., 100 mm, 1 cm, 100 cm, 1000 cm etc.). In some examples, based on the first input device 308 directed to the first portion 304 of the first real-world object 302, the device 200 (e.g., or the device 270) creates a first voxel representation 320 corresponding to the first portion 304 of a first real-world object 302 (e.g., back of the chair). The first voxel representation 320 includes a plurality of voxels. As illustrated in FIG. 3B, the plurality of voxels includes cubes in a regular grid arrangement. Further, the spacing shown in between the voxels in FIG. 3A is shown for illustrative purposes. In some examples, spacing does not exist between voxels. In some examples spacing does exist between voxels. In some examples, the plurality of voxels includes spheres, cylinder, or any geometric three-dimensional shape. In FIG. 3B, based on the first input device 308 being farther away or outside the threshold distance (e.g., 100 mm, 1 cm, 100 cm, 1000 cm etc.) from the first portion 304 (e.g., back of the chair) than in FIGS. 3C-3D (as described below), the first voxel representation 320 corresponds to a lower resolution than in FIGS. 3C-3D. The first voxel representation 320 corresponding to a lower resolution optionally includes fewer number of voxels per unit volume of the three-dimensional environment 300, and thereby larger sized voxels. In some examples, view of the first portion 304 of the first real-world object 302 is replaced with the first voxel representation 320. In some examples, the first voxel representation 320 partially or fully obscures the first portion 304 of the first real-world object 302 (e.g., back of the chair) such that the first portion 304 of the first real-world object 302 has reduced to no visibility to the user in the three-dimensional environment 300.

Before creating the first voxel representation 320 in FIG. 3B, the device 200 optionally presents, via the display generation component 214, a preview user interface element 301 of the first voxel representation 320 corresponding to the first portion 304 of the real-world object 302 in FIG. 3C. For example, FIG. 3C illustrates a preview user interface element 301 having a circular or spherical shape, though other representations are possible. The preview user interface element 301 is optionally presented at a distance from input device 308 or a representation of the input device 308 presented by device 200. The preview user interface element 301 includes a representation of voxels (e.g. automatically generated by device 200), but the voxels are optionally not added in the three-dimensional environment until further input is received. For example, if the preview user interface element 301 moves in accordance with movement of input device 308, the back of chair is visible (e.g., no voxels are deposited). In some examples, the user input includes a hand of the user pressing or tapping on a button or touch-sensitive surface of first input device 308 (e.g., handheld device). In some examples, the preview user interface element 301 is presented in accordance with other inputs. For example, in some examples, the user input includes a hand of the user in air pinch hand shape (e.g., such that the thumb and index finger of the hand are together and touching) while the attention of the user is directed to the first portion 304 of the real-world object 302. In some examples, the user input includes attention of the user directed to the first portion 304 of the real-world object 302 for longer than a threshold amount of time (e.g., 5, 10, 20, 30, 60, etc.). In some examples, the user input includes the hand of the user or first input device 308 in direct interaction with (e.g., touching) the first portion 304 of the real-world object 302.

The device 200 presents the preview user interface element 301 (as illustrated by the dotted line) based on sampling a material, a color, a size, and/or other suitable property of the first portion 304 of the real-world object 302 (e.g., back of the chair). Presenting the preview user interface element 301 can be helpful to a user in verifying the first voxel representation 320 and/or further modifying the position of input device 308 and the preview user interface to target the correction real-world object(s) before the device 200 creates the first voxel representation 320 in the three-dimensional environment 300. In some examples, the preview user interface element 301 is transparent or translucent and overlaid on the first portion 304 of the real-world object 302.

Figure 3D:
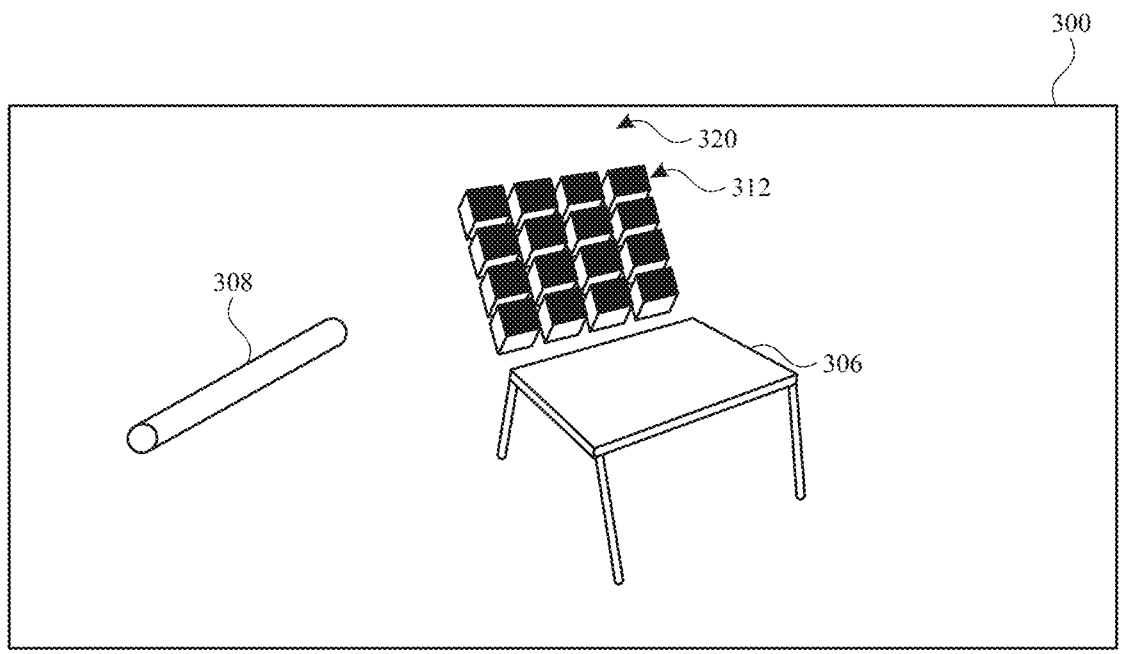
FIG. 3D illustrates an updated voxel representation in accordance with some examples of the disclosure.
Figure 3D:
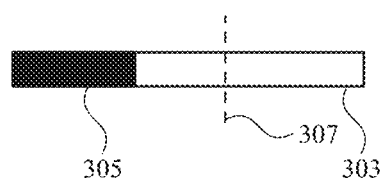

Further, in FIGS. 3C and 3D, the device 200 presents the preview user interface 301 with better resolution compared with the first voxel representation 320 in FIG. 3B based on the first input device 308 being closer to or being within the threshold distance (e.g., 100 mm, 1 cm, 100 cm, 1000 cm etc.) of the first portion 304 of the real-world object 302 compared with FIGS. 3A-3B. FIG. 3B illustrates distance 310 between the first input device 308 and the first portion of the real-world object 302. The preview user interface element 301 of the first voxel representation includes more voxels per volume of the three-dimensional environment 300 in FIG. 3C than in FIG. 3B. In some examples, the preview user interface 301 can have the same level of resolution as the first voxel representation 320 in FIG. 3B irrespective of distance between the first input device 308 and the first portion 304 of the real-world object 302. In some examples, based on receiving subsequent input from the first input device 308, a hand of the user, and/or attention of the user, the device 200 can deposit a plurality of voxels over the preview user interface 301 to create the first voxel representation 320 in FIG. 3D. In some examples, the device 200 overlays the first voxel representation 320 on top of the first portion 304 of the real-world object 302. In some examples, the device 200 replaces the first portion 304 of the real-world object 302 with the first voxel representation 320. In some examples, based on any suitable combination of input from the first input device 308, a hand of the user, and/or attention of the user, the device 200 can present the preview user interface 301 and/or create the first voxel representation 320.

For example, in FIG. 3D, the first voxel representation 320 includes 16 voxels instead of the 4 voxels as shown in FIG. 3B. Further, each of the voxels in FIG. 3D is smaller in size than each of the voxels in FIG. 3B (where the first input device 308 is farther away from the first portion 304 of the first real-world object 302). In FIG. 3D, the updated first voxel representation 320 includes a first plurality of voxels 312 corresponding to the first portion 304 of the first real-world object 302 (e.g., back of the chair).

Further, FIG. 3D includes a time scale 303 with a threshold indicator 307. In some examples, the time scale 303 including the threshold indicator 307 is displayed for the user. In some examples, the time scale 303 including the threshold indicator 307 is not displayed in the three-dimensional environment 300. In some examples, because the amount of time 305 that has elapsed while the device 200 detects the first input device 308 directed towards the first plurality of voxels 312 has not exceeded the amount of time (e.g., 1, 10, 30, 60, 120, 180 s, etc.) indicated by the threshold indicator 307, the device 200 presents the first voxel representation 320 with the resolution shown in FIG. 3D (e.g., forgoes further improving the resolution of the first voxel representation).

Figure 3E:
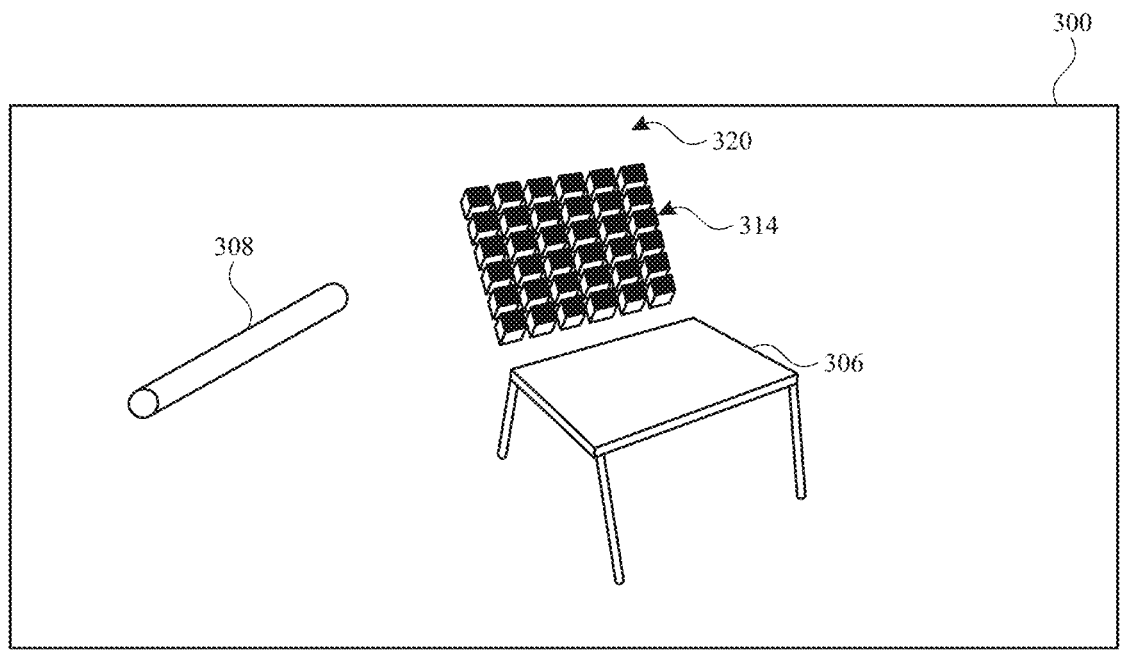
FIG. 3E illustrates a voxel representation having a different resolution in accordance with some examples of the disclosure.
Figure 3E:
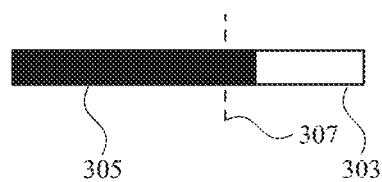

FIG. 3E shows that because the amount of time 305 that has elapsed while the device 200 detects the first input device 308 directed towards the first plurality of voxels 312 has exceeded the amount of time (e.g., 5, 10, 20, 30, 60 etc.) indicated by the threshold indicator 307, the device 200 optionally improves the resolution of the first voxel representation 320 (e.g., increasing the number of voxels from the first plurality of voxels 312 to an updated first plurality of voxels 314). The updated first plurality of voxels 314 includes 36 voxels in FIG. 3E while the first plurality of voxels 312 included 16 voxels in FIG. 3D. Further, increasing the resolution of the first voxel representation 320 results in reduction of the sizes of respective voxels in FIG. 3E compared with FIG. 3D. In some examples, because the first input device 308 has not moved over (e.g., swiped across) the first plurality of voxels 312 greater than a threshold number of times (e.g., 1, 2, 3, 4, 5, 10, 100, etc. times), the device 200 optionally forgoes further adjusting (e.g., increasing) the resolution of the first voxel representation 320 (e.g., increasing the number of voxels within the first plurality of voxels 312).

Figure 3F:
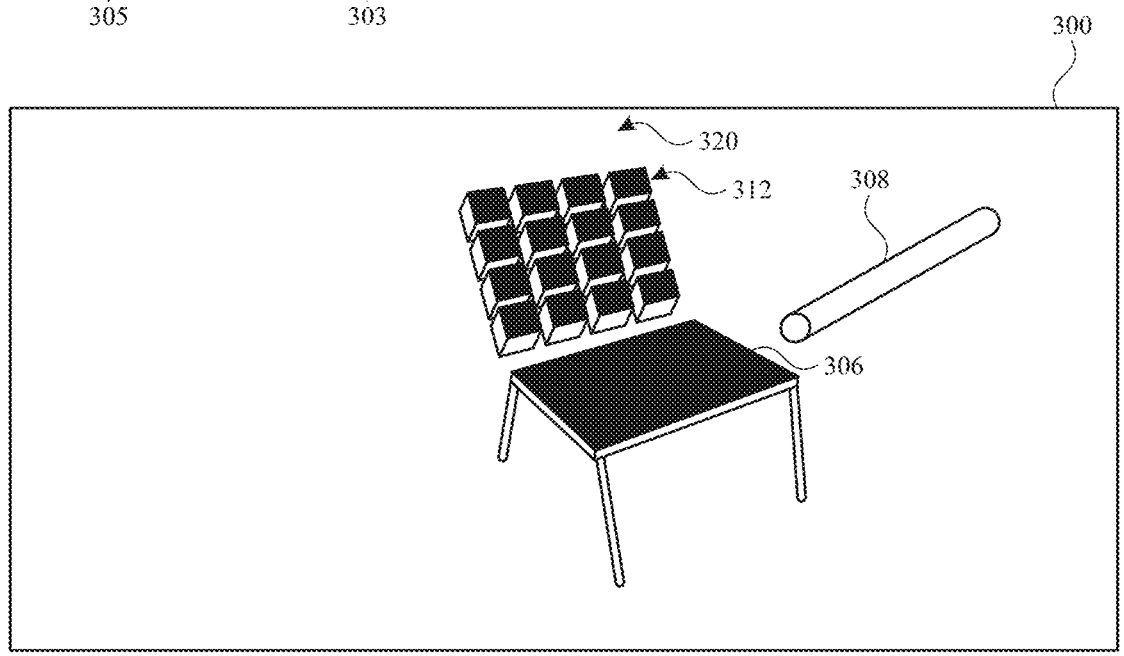
FIG. 3F illustrates a voxel representation corresponding to the first portion and a second portion of the real-world object in accordance with some examples of the disclosure.

FIG. 3F illustrates an input indicative of the first input device 308 directed towards the second portion 306 of the first real-world object 302 (e.g., seat of the chair) to create a voxel representation of the second portion 306 of the first real-world object 302. Accordingly, the seat of the chair is filled with a black color (e.g., emphasized) to indicate the first input device 308 directed towards the seat of the chair.

Figure 3G:
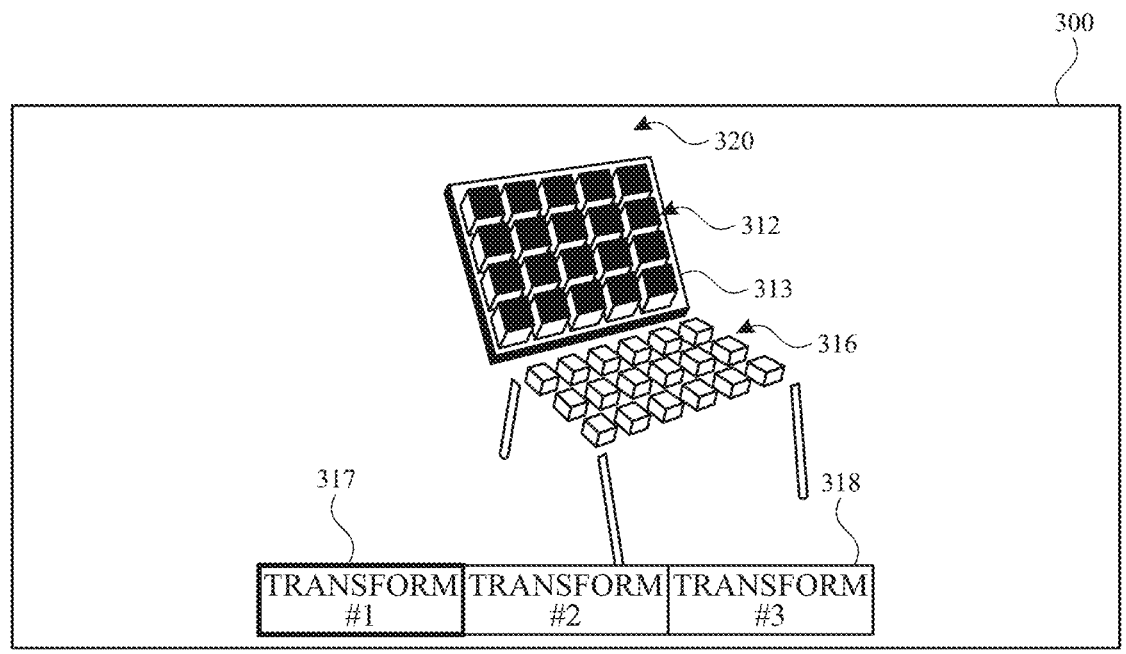
FIGS. 3G-3H illustrate manipulating a voxel representation corresponding to the first portion and a second portion of the real-world object in accordance with some examples of the disclosure.

FIG. 3G illustrates updating the first voxel representation 320 to include a second plurality of voxels 316 corresponding to the second portion 306 of the real-world object 302 (e.g., seat of the chair) in accordance with the first input device 308. Although not shown, as described above, the second plurality of voxels 316 can first be previewed and subsequently created and added to the first voxel representation 320 in accordance with similar inputs, but with targeting moved from the first portion 304 to the second portion 306 of the real-world object 302.

In some examples, a voxel representation can be transformed in the three-dimensional environment. In some examples, the device 200 optionally presents, via the display generation component 214, in the three-dimensional environment, a transformation menu 318 to manipulate the first voxel representation 320 according to a respective transformation mode (e.g., respective input mode). The transformation menu 318 can include a first transformation mode 317 corresponding to translating (e.g., moving) the first voxel representation 320 in one, two, or three dimensions, a second transformation mode corresponding to scaling (e.g., increasing or decreasing the size of) the first voxel representation 320, and/or a third transformation mode corresponding to rotating the first voxel representation 320. Transformation menu 318 is an example for manipulating the first voxel representation 320, but the device 200 can present any suitable transformation menu 318 to transform and/or manipulate the first voxel representation 320. The transformation menu 318 can have any suitable number of transformation options (e.g., 1, 2, 3, 5, 10, etc.).

In some examples, the device 200 optionally presents a transformation menu 318 based on receiving user input. In some examples, the user input requesting a presentation of the transformation menu is different from the user input requesting creation of a voxel representation. In some examples, the user input includes a hand of the user pinching on a button or touch-sensitive surface of first input device 308 (e.g., handheld device) while attention of the user is directed towards the first voxel representation 320. In some examples, the user input includes a hand of the user in air pinch hand shape (e.g., such that the thumb and index finger of the hand are together and touching) while the attention of the user is directed to the first voxel representation 320. In some examples, the user input includes attention of the user directed to the first voxel representation 320 for longer than a threshold amount of time (e.g., 1, 10, 30, 60, 120, 180 s, etc.). In some examples, the user input includes the hand of the user or first input device 308 in direct interaction with (e.g., touching) the first voxel representation 320. In some examples, the user input includes input from that hand of the user not holding the first input device 308.

In FIG. 3G, the device 200 receives user input corresponding to a selection of the first transformation mode 317 (as indicated by the black outline around the first transformation mode 317). In some examples, the user input corresponding to a selection of the first transformation mode 317 includes one or more characteristics of the user input requesting display of the transformation menu 318 described above. In some examples, a respective transformation mode is selected based on user input targeted to the respective transformation mode.

In some examples, the device 200 can classify certain voxels representative of at least a portion of a real-world object based on shared characteristics (e.g., voxels that correspond to the same real-world object or voxels that correspond to the same portion of the real-world object. For example, the device 200 can classify the first plurality of voxels 312 with a "back of the chair" attribute and classify the second plurality of voxels 316 with a "seat of the chair" attribute. Additionally or alternatively, the device 200 can classify the first plurality of voxels 312 and the second plurality of voxels 316 with a "chair" attribute. In some examples, in response to classifying voxels based on shared characteristics corresponding to a real-world object, the device 200 can display a visual indication (e.g., outline 313 in FIG. 3G) around the classified voxels. In some examples, the visual indication is overlaid on the classified voxels (e.g., highlighting). The visual indication provides visual feedback to the user that the classified voxels can be edited and/or moved together without requiring further grouping or authoring input from the user. As illustrated, the first plurality of voxels 312 classified with the "back of the chair" attribute can be edited and/or moved (e.g., based on the first transformation mode) all together without the second plurality of voxels being edited and/or moved. In some examples, the device 200 can display the visual indication at one or more stages of the process for generating a voxel representation, such as in FIGS. 3B, 3D-3F, and 3H.

Figure 3H:
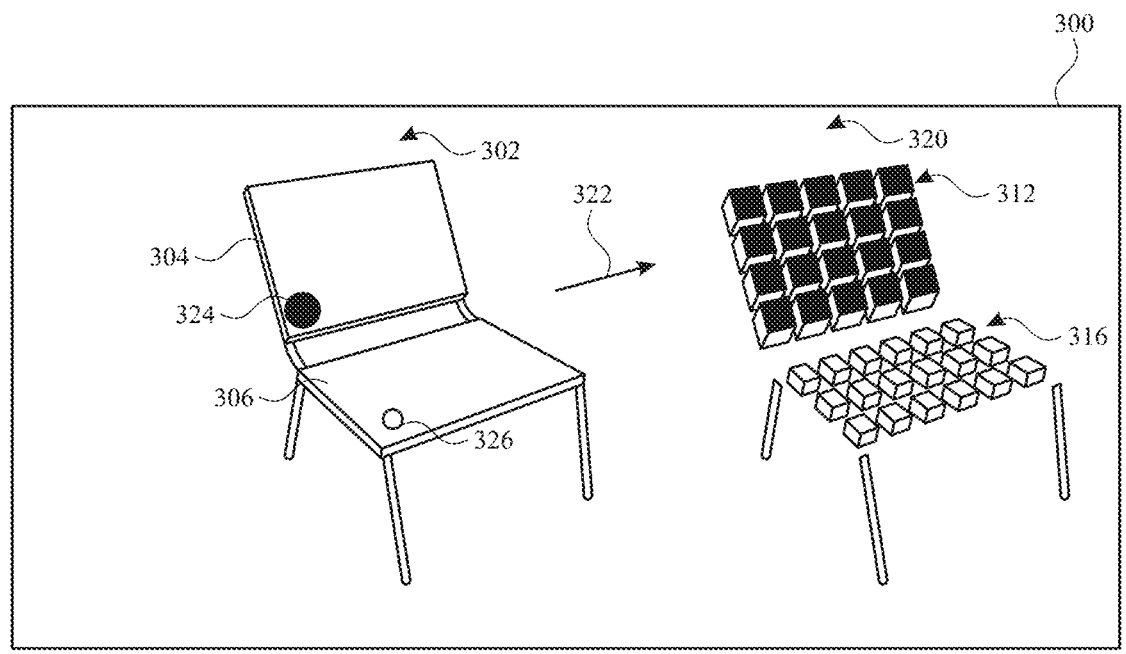

FIG. 3H illustrates results of transformation mode 317 applied to the first voxel representation 320. For example, as illustrated, the device 200 presents movement of the first voxel representation 320 from a first location (e.g., corresponding to the real-world chair) to a second location as indicated by arrow 322. Because the first voxel representation 320 moved from the first location, the first voxel representation 320 no longer obscures the real-world object 302 in the first location. As shown, the real-world object (e.g., chair) including the first portion 304 and the second portion 306 (e.g., seat of the chair) are visible to a user in the three-dimensional environment 300 concurrently with the first voxel representation 320 of the real-world object including the first portion 304 and the second portion 306.

In some examples, the device 200 can transform portions of the first voxel representation 320 independent of other portions of the first voxel representation 320. For example, the device 200 enables movement of a portion of the first voxel representation 320 (e.g., such as only the first plurality of voxels 312 or only the second plurality of voxels 316) from the first location to the second location as indicated by arrow 322. For example, when input is received to move the first plurality of voxels 312 without moving the second plurality of voxels 316 from the first location to the second location, then the first portion 304 of the first real-world object 302 (e.g., back of the seat) would be visible in the three-dimensional environment 300 whereas the second portion 306 of the real-world object (e.g., seat of the chair) would remain obscured (or replaced) by the second plurality of voxels 316 at the first location.

As illustrated in FIG. 3H, the first plurality of voxels 312 corresponds to a first color (e.g., black) locked or sampled from the first portion 304 of the first real-world object 302 (as shown by the sampling area 324 in the back of the chair) because the first plurality of voxels 312 are classified with the "back of the chair" attribute. Further, the second plurality of voxels 316 correspond to a second color (e.g., white) locked or sampled from the second portion 306 of the first real-world object 302 (as shown by the sampling area 326 in the seat of the chair) because the second plurality of voxels 316 are classified with the "seat of the chair" attribute. In some examples, the back of the chair can include different shades of black (e.g., the color lock limits the spectrum of colors, but does not require each of the voxels to have identical color). Accordingly, the first plurality of voxels 312 can correspond to the different shades of black of the back of the chair. In some examples, the back of the chair can be black with a single white spot. Despite the back of the chair having a white spot, the first plurality of voxels 312 can be black based on the sampling area 324 corresponding to a black portion of the back of the chair.

Figure 3I:
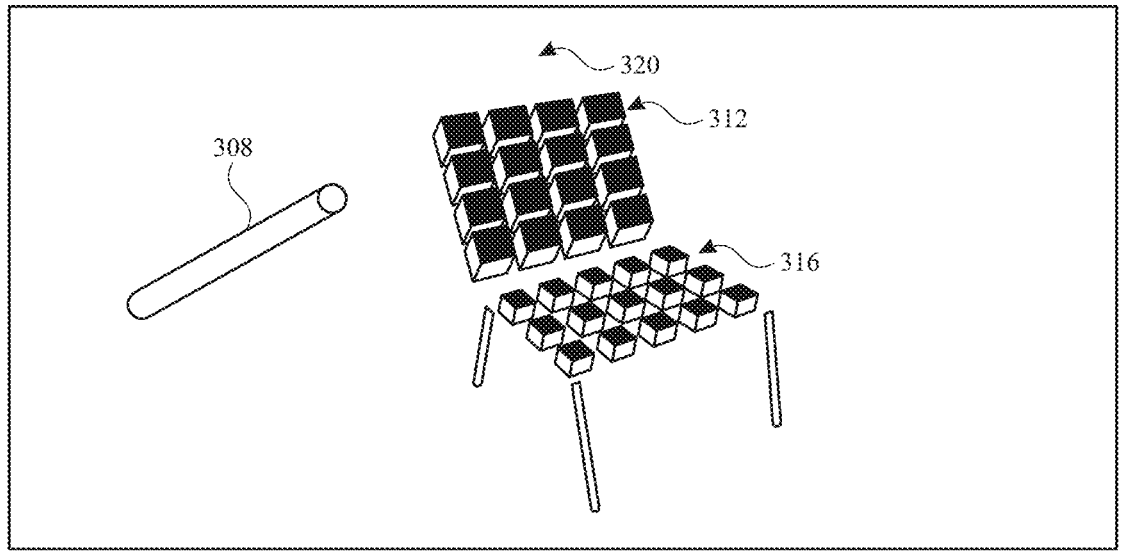
FIGS. 3I-3K illustrate a voxel representation corresponding to color based on a color lock of the real-world object in accordance with some examples of the disclosure.

FIG. 3I illustrates results of transformation mode 317 applied to the first voxel representation 320, in which the first plurality of voxels 312 and the second plurality of voxels 316 correspond to the first color (e.g., black). As illustrated in FIG. 3I, the first color is locked or sampled from the first portion 304 of the first real-world object 302 (as shown by the sampling area 324 in FIG. 3H) because user input is directed towards the first portion 304 at the start of the user input. Despite the first real-world object 302 including different colors (e.g., first portion 304 corresponding to the back of the seat is black while the second portion 306 corresponding to the seat of the chair is white), the voxel representation in FIG. 3I includes one color voxels (e.g., black colored first plurality of voxels 312 and black colored second plurality of voxels 316) because the color of the voxels is locked based on a color of a portion of the first real-world object to which user input is initially directed.

In some examples, the color of a voxel is based on a color spectrum of neighboring voxels. For example, if the real-world object is a black chair with a white spot, then a voxel representation of the real-world object includes one or more white voxels representative of the white spot in the black chair and a plurality of black voxels representative of the black chair. In some examples, the color of the one or more white voxels is optionally darker compared to the real-world white spot on account of the black color of the neighboring voxels (e.g., filtering whiter voxels based on neighboring blacker voxels causes the darkening of the whiter voxels). In some examples, the color of voxel is locked to a reduced color spectrum. For example, if an input device (e.g., first input device 308) is directed to a black portion of the black chair with the white spot, and the color black is locked with a limited color spectrum around the color black, then the one or more voxels corresponding to the white spot are represented by a color in the limited color spectrum and appear darker than white with a color a threshold amount (as allowed by the limited color spectrum) lighter than the plurality of voxels corresponding to the black portion of the black chair. For example, the one or more voxels corresponding to the white spot cannot be lighter than the plurality of voxels corresponding to the black portion by greater than the threshold amount. Accordingly, limiting the shades of the of one or more voxels corresponding to the white spot when the color black is locked allows the one or more voxels corresponding to the white spot to not appear as dark (e.g., black) as the plurality of voxels corresponding to the black portion but also not appear as white as the real-world white spot. Alternatively, if an input device (e.g., first input device 308) is directed to the white spot of the black chair, and the color white is locked with a limited color spectrum around the color white, then the plurality of voxels corresponding to the black portion of the chair are represented by a color in the limited color spectrum and appear lighter than black with a color a threshold amount (as allowed by the limited color spectrum) darker than the one or more voxels corresponding to the white spot. For example, the plurality of voxels corresponding to the black portion cannot be darker than the one or more voxels corresponding to the white spot by greater than the threshold amount. Accordingly, the plurality of voxels corresponding to the black portion do not appear as light (e.g., white) as one or more voxels corresponding to the white spot but also do not appear as black as the real-world black portion of the black chair. In some examples, the black chair optionally with the white spot is in a room with white walls. In some examples, because the device 200 can classify the black chair and the white walls as separate objects, the color of voxels corresponding to the white walls are not affected by neighboring voxels corresponding to the edge of the black chair with the white spot (e.g., filtering does not apply between semantically distinct objects). Similarly, the color of the voxels corresponding to the edge of the black chair are optionally not affected by neighboring voxels corresponding to the white walls (e.g., filtering does not apply between semantically distinct objects).

Figure 3J:
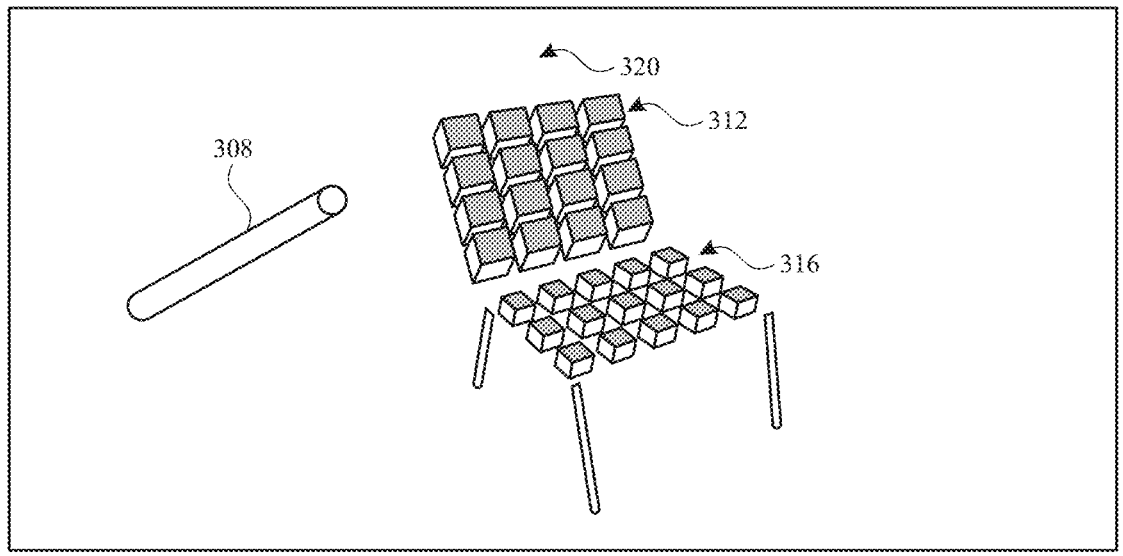

FIG. 3J illustrates results of transformation mode 317 applied to the first voxel representation 320, in which the first plurality of voxels 312 and the second plurality of voxels 316 correspond to a third color (e.g., gray) different from the first color (e.g., black) of the first portion 304 of the real-world object 302 and the second color (e.g., white) of the second portion 306 of the real-world object 302. In some examples, the third color is a blending or combination of a plurality of colors of the real-world object. Accordingly, the third color (e.g., gray) is a blending of the first color (e.g., black) of the first portion 304 of the real-world object 302 and the second color (e.g., white) of the second portion 306 of the real-world object 302.

Figure 3K:
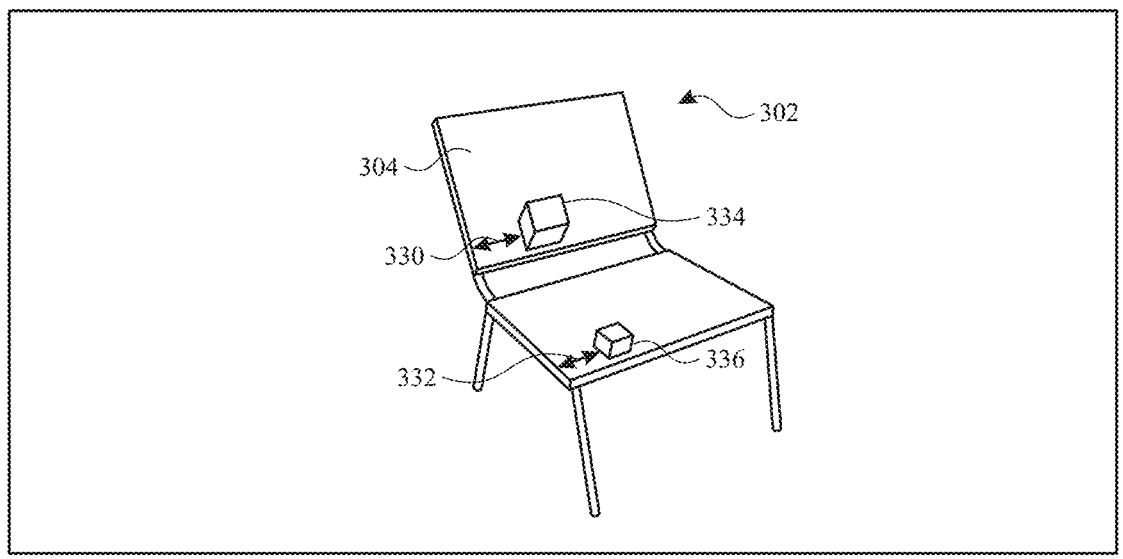

FIG. 3K illustrates one or more voxels corresponding to the real-world object 302. with respective positions of the one or more voxels offset by a predefined or varying amount. When creating a voxel representation, respective positions of voxels (e.g., particularly voxels located around an exterior of a voxel representation) are offset by a threshold amount inward from the real-world object 302. Offsetting a voxel in an inward direction relative to the real-world prevents the voxel from appearing inflated relative to the real-world object and/or prevents the voxel from projecting outwards from a position in the three-dimensional environment to which an input device (e.g., first input device 308) is directed. Voxels larger in size (e.g., larger in length, height, width, and/or volume) are optionally offset by a greater amount compared to voxels smaller in size (e.g., larger in length, height, width, and/or volume). As illustrated, voxel 334 corresponding to the first portion 304 of the real-world object 302 is larger in size compared to voxel 336 corresponding to the second portion 306 of the real-world object 302. Because voxel 334 is larger in size compared to voxel 336, the position of voxel 334 is offset by a greater amount compared to the position of voxel 336 (e.g., as indicated by the length of arrows 330 and 332). In some examples, a position of the voxel is offset by half a dimension (e.g., length, width, diameter, and/or height) of the voxel. For example, if the voxel has a length of 1 cm, then the position of the voxel is offset by 0.5 cm.

Figure 4A:
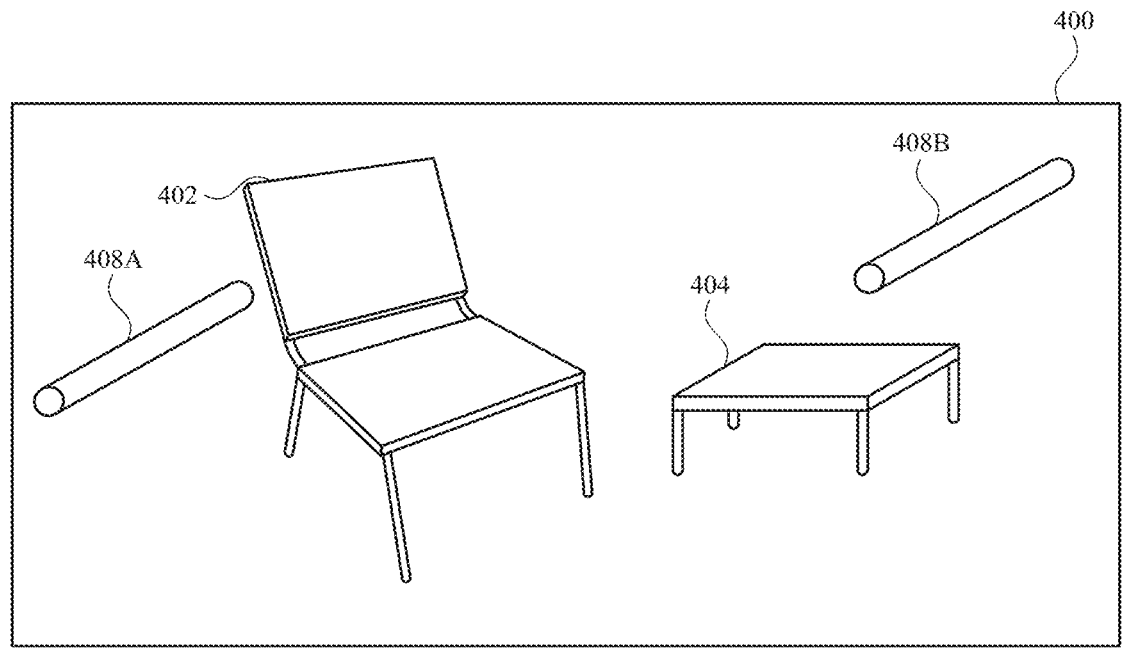
FIGS. 4A-4B illustrate a first voxel representation corresponding to a first real-world object and a second voxel representation corresponding to a second real-world object in accordance with some examples of the disclosure.
Figure 4B:
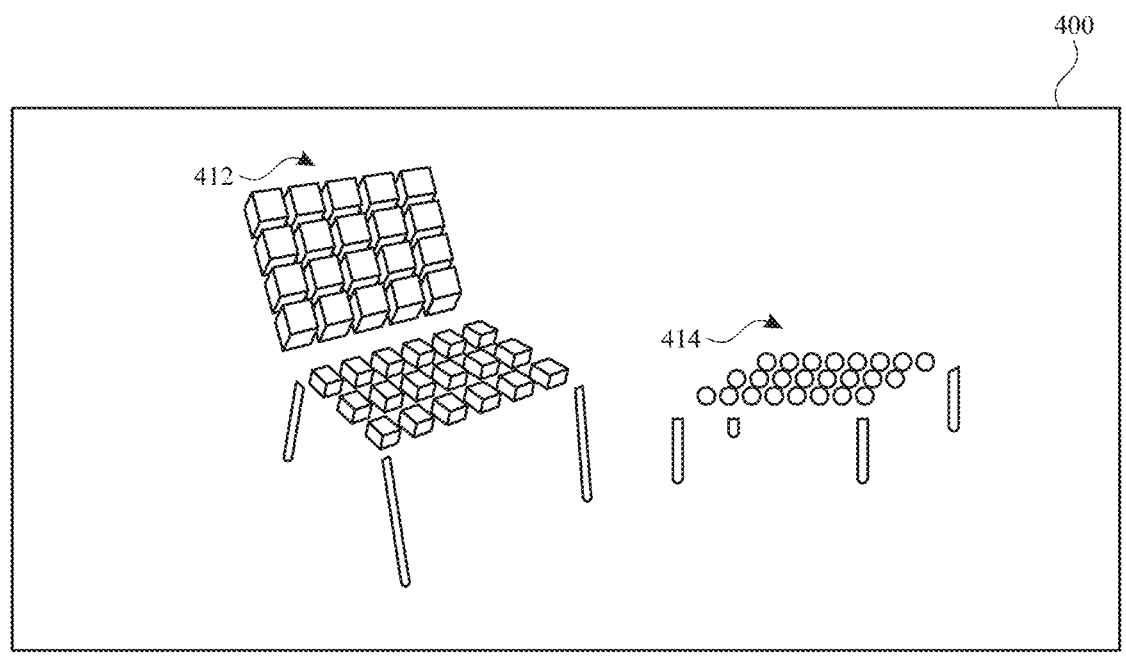

FIGS. 4A-4B illustrate a first voxel representation 412 corresponding to a first real-world object 402 and a second voxel representation 414 corresponding to a second real-world object 404 in accordance with some examples of the disclosure. FIG. 4A illustrates a first user input 408A (e.g., corresponding to device 260) directed towards a first real-world object 402 (e.g., chair) and a second user input 408B (e.g., corresponding to device 260) directed towards a second real-world object 404 (e.g., table) in three-dimensional environment 400. In FIG. 4B, based on the first user input 408A directed towards the first real-world object 402, the device 200 creates the first voxel representation 412 corresponding to the chair. Further, based on the second user input 408B directed towards the second real-world object 404, the device 200 creates the second voxel representation 414 corresponding to the table. In some examples, the first voxel representation 412 and the second voxel representation 414 include the same number, size, shape, color, and/or other properties of voxels. In some examples, the first voxel representation 412 and the second voxel representation 414 include different number, size, shape, color, and/or other properties of voxels. As illustrated in FIG. 4B, the first voxel representation 412 includes voxels shaped as cubes and the second voxel representation 414 includes voxels shaped as spheres.

Figure 4C:
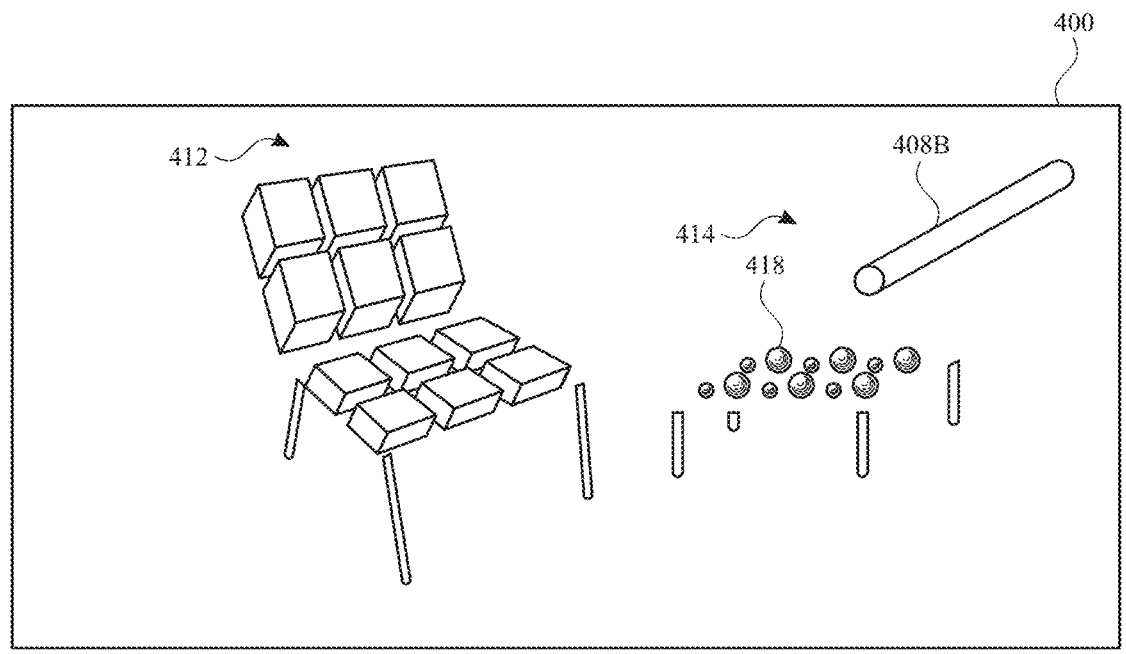
FIGS. 4C-4D illustrate animating voxels of the second voxel representation corresponding to the second real-world object in accordance with some examples of the disclosure.

In some examples, the first voxel representation 412 and/or the second voxel representation 414 can be animated as illustrated in FIG. 4C. As described herein, animating voxels includes changing an orientation, size, and/or position of the voxels. For example, the cube voxels of first voxel representation 412 are increased in size (e.g., appears inflated) from FIG. 4B to FIG. 4C. At least one sphere voxel 418 of the second voxel representation 414 has increased in size (e.g., appears inflated). In some examples, each voxel of a voxel representation has the same size (e.g., cube voxels of first voxel representation 412 in FIG. 4C). In some examples, respective voxels a voxel representation can have different sizes (e.g., smaller and larger sphere voxels of the second voxel representation 414 in FIG. 4C).

Figure 4D:
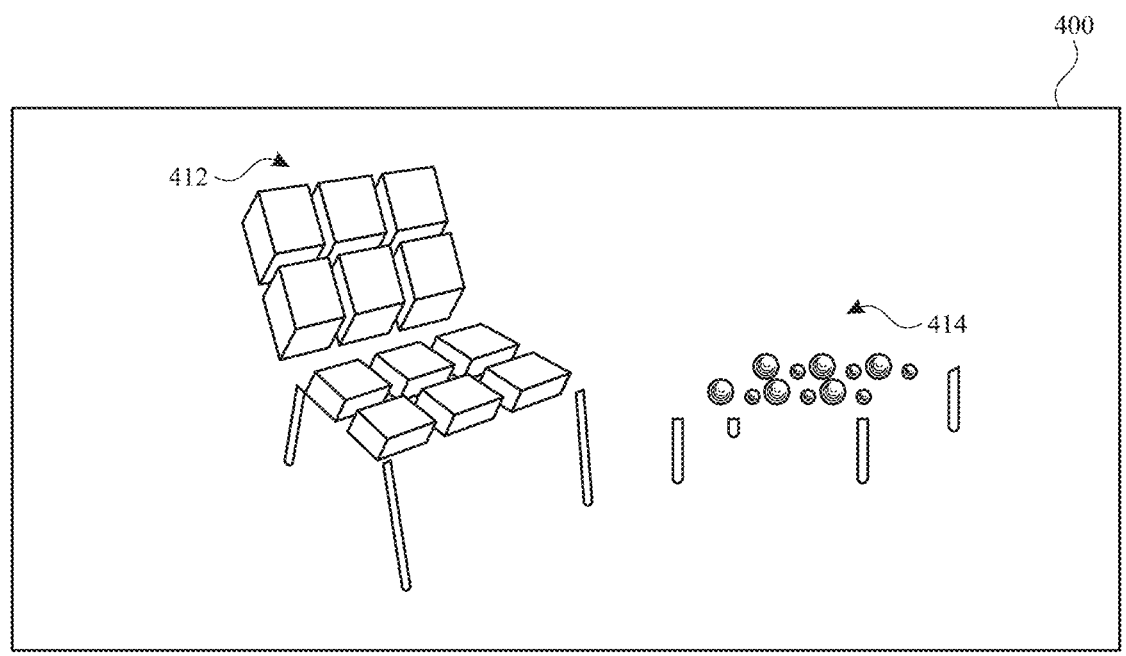

In FIG. 4D, sphere voxels in the second voxel representation 414 have different position compared to FIG. 4C. For example, the larger sphere voxels are in the position of the smaller sphere voxels and vice versa from FIG. 4C to FIG. 4D. In some examples, based on the second input device 408b having moved over (e.g., swiped across) the sphere voxels of the second voxel representation 414 greater than a threshold number of times (e.g., 1, 2, 3, 4, 5, 10, 100, etc. times), the device 200 animates (e.g., changes position of) the sphere voxels in FIG. 4D. In some examples, based on the second input device 408b being directed to the sphere voxels of the second voxel representation 414 for greater than a threshold amount of time (e.g., 1, 10, 30, 60, 120, 180 s, etc.), the device 200 animates (e.g., changes position of) the sphere voxels in FIG. 4D.

Figure 5A:
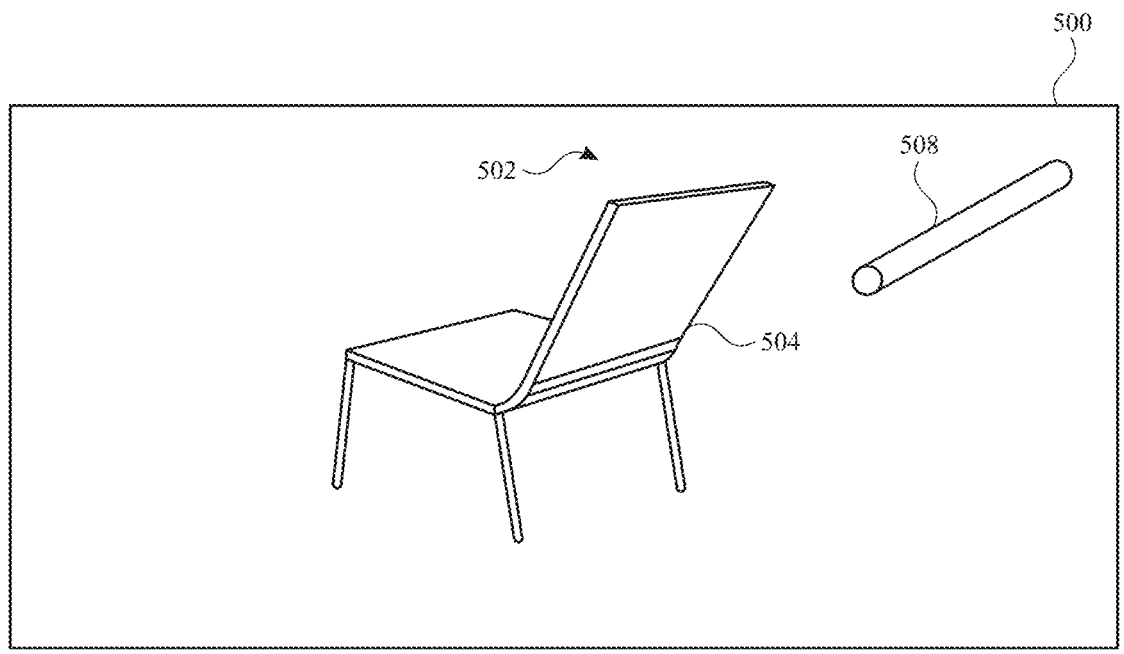
FIGS. 5A-5D illustrate color locking for a voxel representation in accordance with some examples of the disclosure.
Figure 5B:
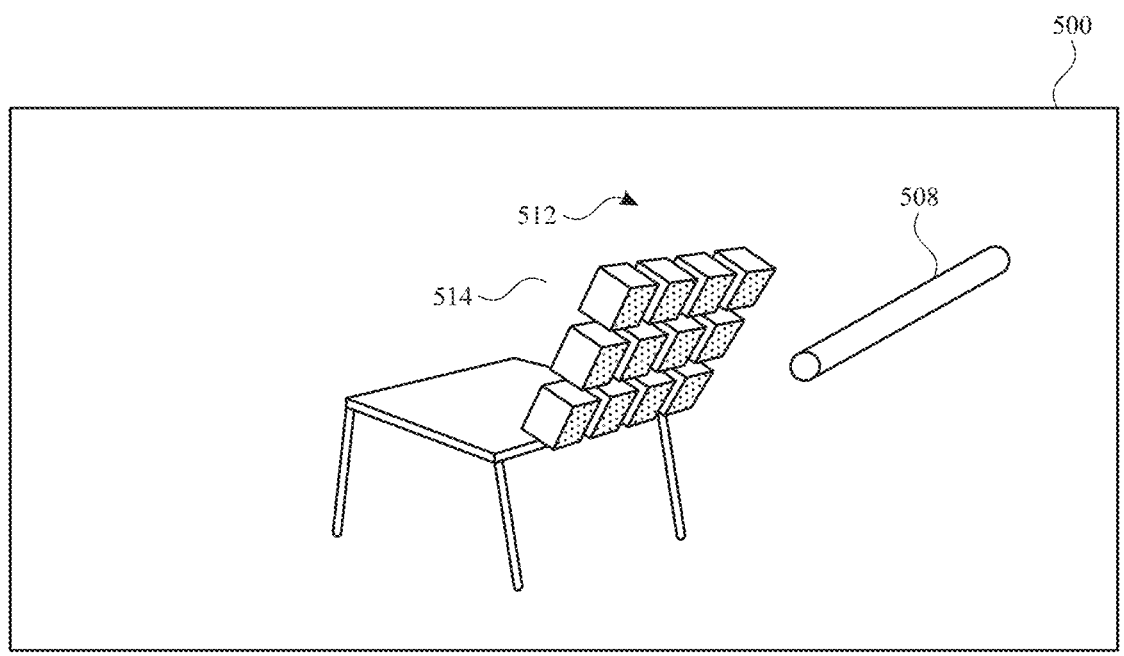

FIGS. 5A-5D illustrate a color lock for a voxel representation in accordance with some examples of the disclosure. FIG. 5A illustrates a first input device 508 (e.g., such as device 260) directed to a first portion 504 of the real-world object 502 (e.g., back of the chair) in three-dimensional environment 500. Unlike FIG. 3A where the first input device 308 is directed to the front of the back of the chair, the first input device 508 in FIG. 5A is directed to the back of the first portion 504 (e.g., back of the chair). Accordingly, the system creates a voxel representation 512 based on the back of the first portion 504 (e.g., back of the chair), such as shown in FIG. 5B. In some examples, the voxel representation 512 corresponds to a different color 514 (as shown by the dotted pattern) than the first voxel representation 320 in FIG. 3A because lighting effects of the back of the chair can be different from a first orientation (e.g., front side of the back of the chair) to a second orientation (e.g., back side of the back of the chair).

Figure 5C:
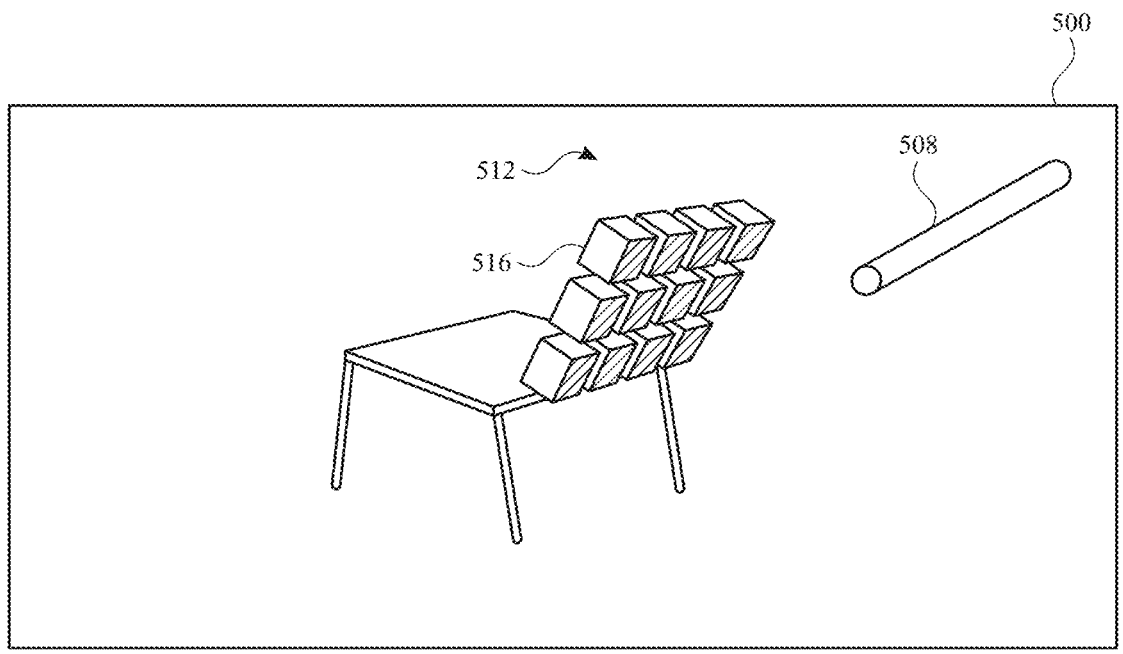
Figure 5D:
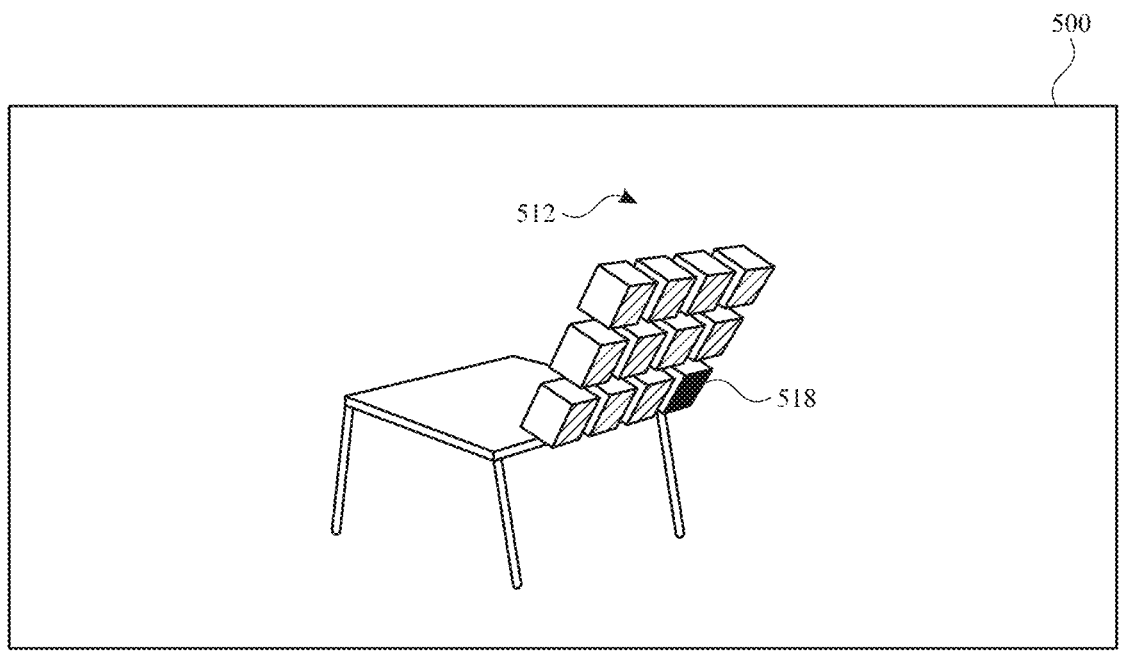

In some examples, after the device has created the voxel representation 512, the device 200 can modify size, color, shape, material, or other properties of the voxels corresponding to the voxel representation 512 based on user input from an input device 508. FIG. 5C illustrates modifying size, color, shape, material, or other properties of each voxel 516 corresponding to the voxel representation 512 based on user input. In some embodiments, the user input includes the input device 508 moving over (e.g., swiping across) each voxel 516 corresponding to the voxel representation 512. FIG. 5D illustrates modifying size, color, shape, material, or other properties of a single voxel 518 corresponding to the voxel representation 512 based on user input. In some embodiments, the user input includes the input device 508 directly or indirectly interaction with the single voxel 518. For example, to select the single voxel 518 and/or subsequently modify the single voxel 518, the user input can include pinching on a button or a touch-sensitive surface of the first input device 508 while the attention of the user is directed towards the single voxel 518. In some examples, the user input can include a hand of the user in air pinch hand shape (e.g., such that the thumb and index finger of the hand are together and touching) while the attention of the user is directed to the single voxel 518. In some examples, the user input includes attention of the user directed to single voxel 518 for longer than a threshold amount of time (e.g., 1, 10, 30, 60, 120, 180 s, etc.). In some examples, the user input includes the hand of the user or first input device 508 in direct interaction with (e.g., touching) the single voxel 518.

FIGS. 6A-6H illustrate exemplary techniques for generating and editing voxel representations in accordance with some examples of the disclosure. Techniques for generating and editing voxel representations described with reference to FIGS. 6A-6H can correspond to a second operating mode (e.g., in contrast to a first operating mode corresponding to the techniques described with reference to FIGS. 3A-5D).

Figure 6A:
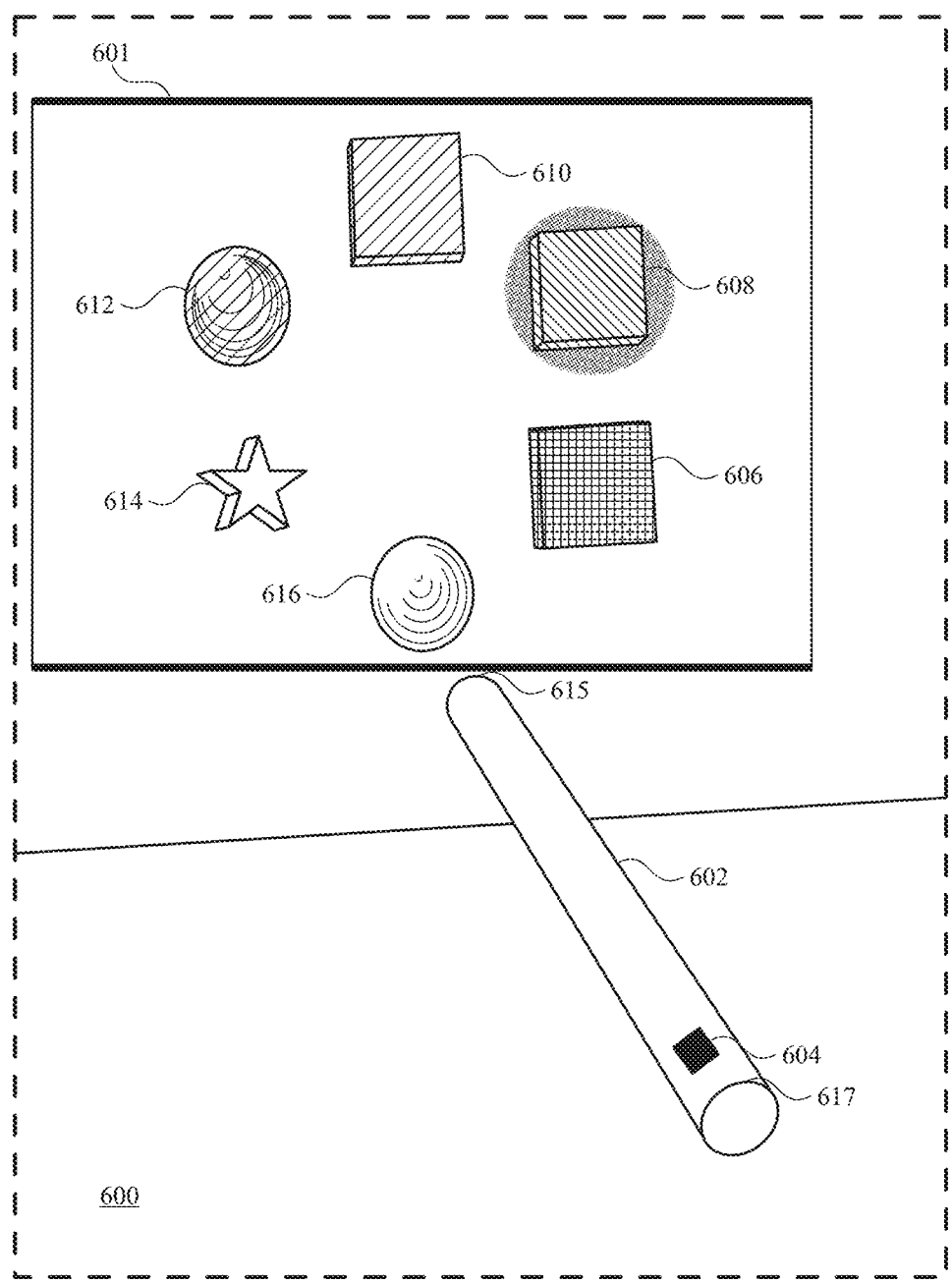

FIG. 6A illustrates an example computer-generated environment 600 that includes a virtual device 602, which may be a representation of a (physical) input device, such as device 260. Computer-generated environment 600 includes a user interface 601 with multiple user interface elements 606, 608, 610, 612, 616 that may each be a selectable representation of a preview voxel, and a user interface element 614 that may be a representation of a lighting element. In some examples, the user interface elements 606, 608, 610, 612, 614, 616 are located at a distance from a first end 615 of the virtual device 602. Each of user interface elements 606, 608, 610, 612, 616 representing a selectable voxel type has a different shape, color, and/or texture, and indicates the visual characteristics of a voxel that may be used to generate or edit a virtual object in the computer-generated environment 600. User interface element 614 represents a lighting effect to be applied to a virtual object using the input device. In some examples, when an input device detects that the input device is pointed at a physical location that corresponds to a virtual location of a particular user interface element, the particular user interface element may be visually highlighted or otherwise emphasized to convey to the user that the user is pointing the input device at a physical location corresponding to a virtual location of the particular user interface element. In some examples, a particular user interface element may be highlighted if it was previously selected before launching user interface 601, whether or not the input device is directed to a physical location corresponding to the virtual location of the particular user interface element. In the example of FIG. 6A, user interface element 608 is highlighted, which may indicate that the user has previously selected user interface element 608 or (in other examples) that the input device is currently targeting user interface element 608 for selection.

In some examples, a user may select a particular user interface element in user interface 601 by pointing the input device towards a physical location corresponding to the desired user interface element and providing a selection input to the input device, such as a tap, a double-tap, a soft press, a hard press, a swipe along a touch-sensitive portion of the input device, a gesture while holding the input device, or another type of input. As described herein, after selecting a particular user interface element, the user may begin to generate or edit a virtual object by placing voxels having the visual characteristics of the selected user interface element to form the virtual object, or by changing the lighting characteristics of an existing virtual object by selecting user interface element 614. In some examples, a representation 604 of a selected voxel type corresponding to the selected user interface element is presented on a portion (e.g., second end 617) of the virtual device 602 or other suitable portion of the input device. The representation 604 of the selected voxel type may be, for example, the color of the voxel type, the shape of the voxel type, and/or the material of the voxel type, and/or may provide the user with another indication of which voxel type has been selected or is active.

In some examples, user interface 601 may be invoked via an input detected by an input device, such as a tap, a double tap, etc., or via an input on another input source (e.g., a user's gesture as detected by hand-tracking sensors, etc.) In some examples, user interface 601 may automatically cease to be displayed after a user interface element is selected and/or may cease to be displayed in response to a user input.

Figure 6B:
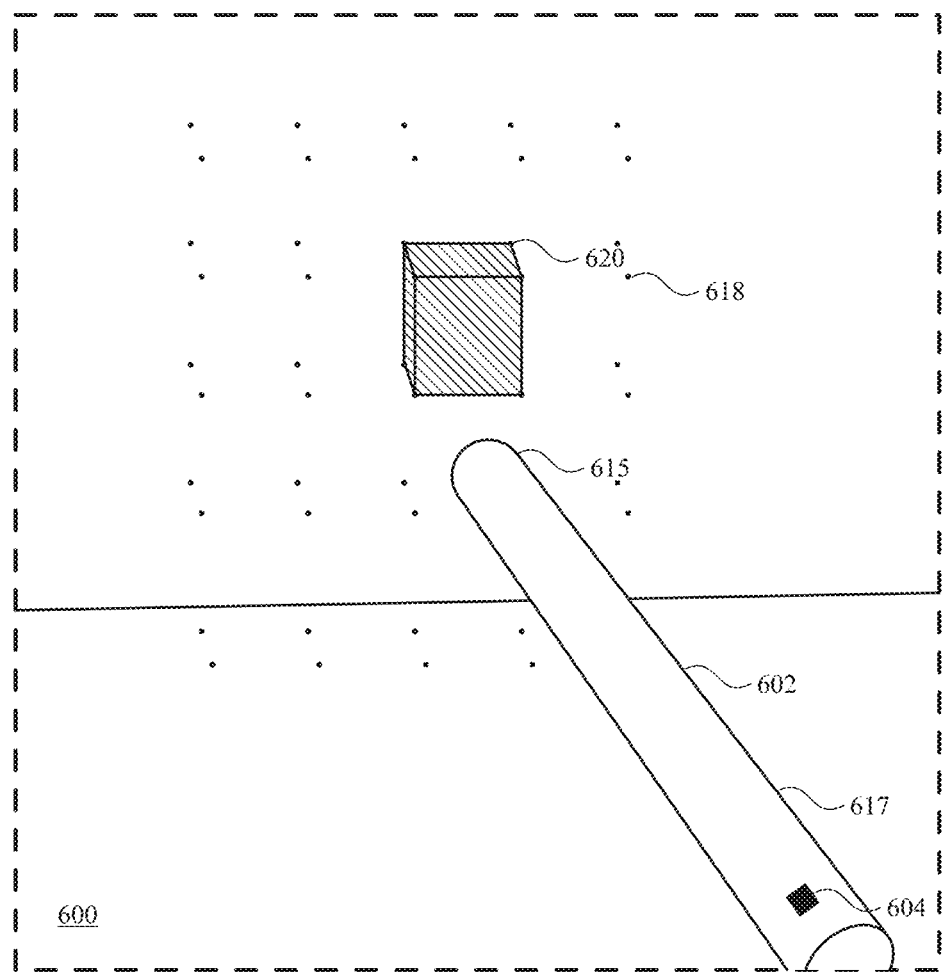

FIG. 6B illustrates an example computer-generated environment 600 including a virtual device 602 and a preview voxel 620. The preview voxel 620 may correspond to the voxel type of a selected user interface element (e.g., user interface element 608 from user interface 601). The view of FIG. 6B may also correspond to the appearance before launching user interface menu 601. The preview voxel 620 may provide an indication of a visual characteristic of voxels that may be deposited using the input device, for example, and the appearance of the preview voxel 620 may be based on the selection of a user interface element as described with reference to FIG. 6A. For example, selection of user interface element 608 may result in display of preview voxel 620, which has the same visual characteristics as user interface element 608. In some examples, preview voxel 620 also indicates a virtual location in the computer-generated environment at which a voxel may be deposited based on the current physical location to which the input device is directed. As shown in FIG. 6B, the preview voxel 620 may be presented at a distance from a first end 615 of the virtual device.

A virtual grid 618 is a three-dimensional computer-generated grid that defines virtual locations, each of which has a volume into which a voxel may be deposited. In some examples, the virtual grid 618 and preview voxel 620 change location within the computer-generated environment based on movement detected by the input device such that the virtual grid 618 and preview voxel 620 appear to follow (e.g., move with) the first end 615 of the virtual device 602 (e.g., an end of the virtual device 602 that appears closest to the virtual grid 618 and preview voxel 620). In some examples, the virtual grid 618 is presented in an area or region around the preview voxel 620 but is not presented in the entire computer-generated environment 600. For example, the virtual grid may include from two to six (2-6) virtual locations along each dimension adjacent to preview voxel 620 and three-dimensionally arrayed around the preview voxel 620, indicating nearby virtual locations. In some examples, the virtual grid may be a planar grid rather than a three-dimensional grid, with virtual locations arranged in a plane around a face (e.g., a first side) of preview voxel 620. In some examples, the grid may visually fade out as virtual locations get farther away from the previous voxel 620. By restricting the area of the virtual grid 618 to be near the preview voxel 620 but not everywhere in the computer-generated environment 600, the system may reduce the cognitive burden on the user by reducing the amount of visual information presented to the user. Although the virtual grid 618 is depicted as a grid of dots (e.g., corresponding to vertices of the grid volumes), the disclosure is not so limited. For example, a virtual grid may be presented as a grid of squares or as another form of grid. Although a limited virtual grid is shown in FIG. 6B, it is understood that, in some examples, a larger grid can optionally be displayed. Additionally, it is understood that the size of the virtual grid may be user configurable.

In the example of FIG. 6B, the virtual location (e.g., a location within virtual grid 618) at which the preview voxel 620 is presented is empty. That is, a voxel has not been previously deposited at that virtual location. The user may choose to deposit a voxel at the virtual location in which the preview voxel 620 is displayed by providing a selection input and a release input. In general, a selection input may be used to indicate a starting virtual location at which voxels are to be deposited, and a release input may be used to indicate an ending virtual location at which the voxels are to be deposited. Thus, in accordance with a determination that the user has provided a selection input and a release input while the preview voxel 620 is presented at the virtual location as depicted in FIG. 6B, a voxel may be deposited at a first virtual location corresponding to the virtual location of the preview voxel 620 at the time of the input such that a single voxel is created at the virtual location in the computer-generated environment. The voxel may have the visual characteristics of preview voxel 620, for example. As a result of deposition of the voxel at the first location, the first location remains filled with the voxel even after a user moves the input device (and preview voxel) to a different location.

A user may wish to deposit or remove voxels from one or more virtual locations in the computer-generated environment. In some examples, the user may be able to deposit or remove a single voxel by providing a selection input and a release input while the virtual device is directed at a single virtual location. In some examples, the user may be able to deposit or remove multiple voxels by providing an input that includes a selection input while the virtual device is directed to a first virtual location, a movement input, and a release input while the virtual device is directed at a second virtual location. The first and second virtual locations may or may not be adjacent, and intervening virtual locations (e.g., along a path between the first and second virtual locations) may also have voxels deposited or removed based on the input. Non-limiting examples of depositing and removing voxels are provided in FIGS. 6C-6H.

Figure 6C:
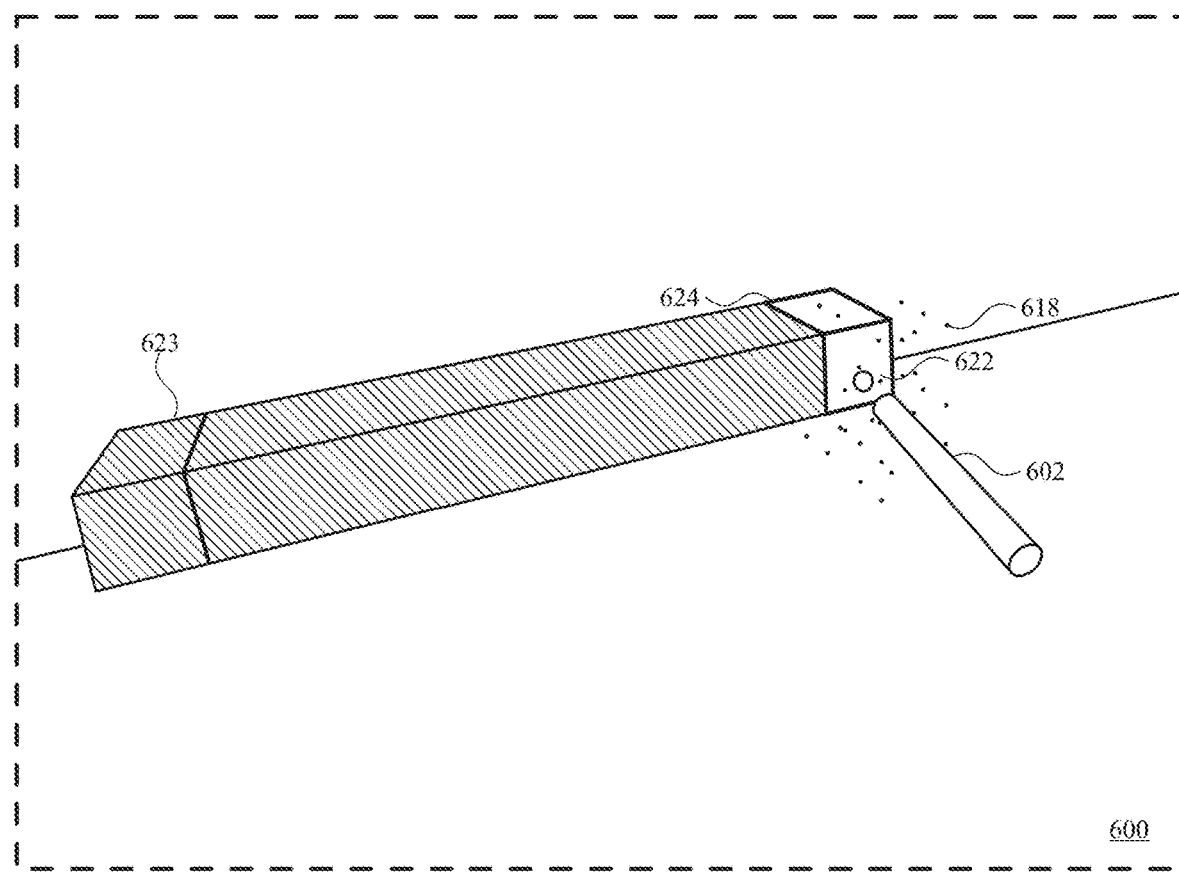

In some examples, a user may wish to fill multiple adjacent virtual locations with voxels. FIG. 6C depicts a computer-generated environment in which the user has filled multiple adjacent virtual locations with voxels to form a rectangular cuboid. In this example, the user may have provided a selection input at a first virtual location corresponding to a first voxel 623, a movement input from the first virtual location corresponding to the first voxel to a second virtual location corresponding to the second voxel 624, and a release input at the second virtual location. In accordance with a determination that the selection input, movement input, and release input have been detected, the system may fill the first virtual location, the second virtual location, and the intervening virtual locations (if any) with voxels, including voxels 623 and 624. In some examples, as shown in FIG. 6C, a pointer indicator 622 may be presented in the computer-generated environment to indicate a virtual pointing direction of virtual device 602.

In some examples, if a virtual location has already been filled with a voxel and that virtual location is subsequently selected by the user (e.g., the user provides a selection input and a release input while the virtual device is directed to the virtual location), the existing voxel may be removed (e.g., deleted) from the computer-generated environment. Thus, the input device may, in some examples, operate as a toggle for depositing or removing voxels based on whether a voxel has previously been deposited at a selected virtual location—if a voxel has not been previously deposited at the virtual location, a new voxel is added there, and if a voxel was previously deposited at the virtual location, it is removed.

In some examples, the toggle behavior may depend on whether the currently active preview voxel matches a voxel at the virtual location. That is, if there is an existing voxel at the selected virtual location(s) that has the same visual characteristics as the preview voxel and an input is detected (e.g., including a selection input and a release input), the voxel at the virtual location(s) may be removed. If the existing voxel at the selected virtual location(s) has different visual characteristics than the preview voxel, the voxel may not be removed. In this manner, the user may be able to remove voxels corresponding to the currently selected preview voxel without necessarily removing voxels that do not correspond to the currently selected preview voxel.

Figure 6D:
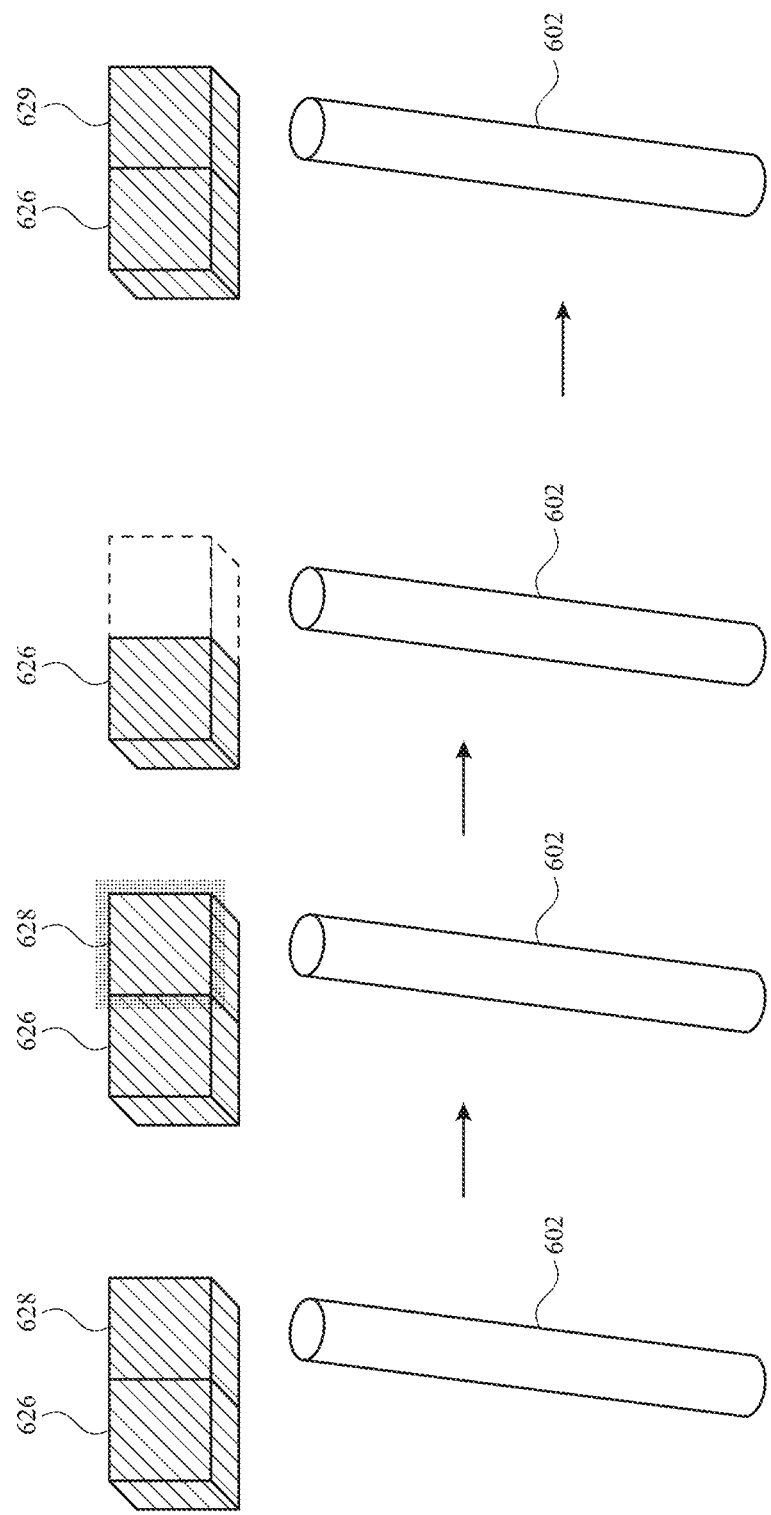

FIG. 6D depicts an exemplary flow for adding and removing voxels to create and edit a voxel representation, in accordance with some examples of the disclosure. A representation of an input device is shown as a virtual device 602. For ease of illustration, a preview voxel is not shown in FIG. 6D at a distance from the virtual device 602.

At a first stage, a first voxel 626 and a second voxel 628 may have been deposited at first and second virtual locations, respectively, that are adjacent to each other. The first and second virtual locations may correspond to first and second physical locations. The input device may be directed to (e.g., pointing at) the second physical location such that the virtual device 602 is directed to the second virtual location, corresponding to the second voxel 628.

At a second stage, a user may provide a selection input. In accordance with detection of the selection input while the input device is directed to the second physical location, the second voxel 628 may be highlighted. In some examples, the second voxel 628 may be highlighted by the overlap of a preview voxel with the second voxel 628; that is, the preview voxel itself may convey selection of the second voxel 628 to the user rather than a separate highlighting characteristic.

At a third stage, the user may then provide a release input. In accordance with detection of the release input after the selection input (and while the input device is directed to the second physical location), the second voxel 628 may be removed. In some examples, a preview voxel (not shown) may be displayed at the second virtual location in place of the removed second voxel 628.

At a fourth stage, while still directing the input device to the second physical location, the user may provide a selection input and a release input. In accordance with detecting the selection input and the release input, a third voxel 629 may be deposited at the second virtual location.

Figure 6E:
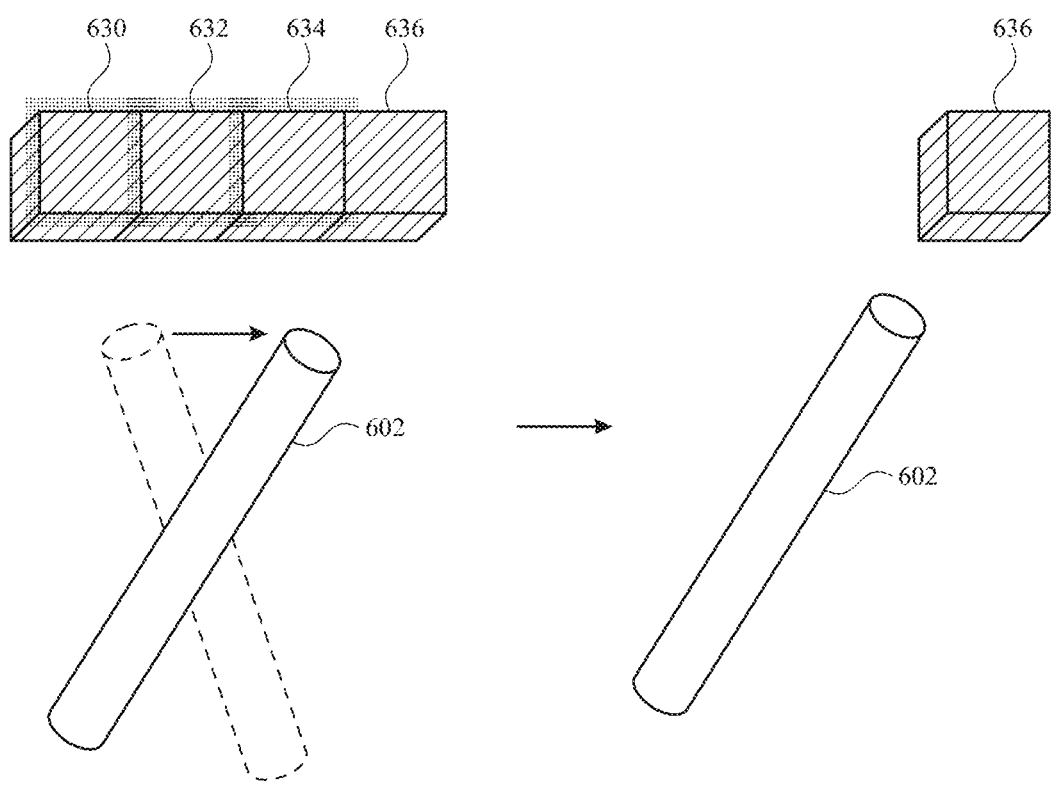

FIG. 6E depicts an exemplary flow for removing multiple voxels based on detection, via an input device, of a first input that includes a selection input, a movement input, and a release input. A representation of the input device is shown as a virtual device 602.

In FIG. 6E, a first voxel 630, a second voxel 632, a third voxel 634, and a fourth voxel 636 have been deposited at a first virtual location, a second virtual location, a third virtual location, and a fourth virtual location, respectively. A first input is detected via the input device. The first input includes a selection input detected while the input device is pointing to a first physical location corresponding to the first virtual location, which may represent a starting virtual location for an operation to be performed (e.g., corresponding to a preview voxel, which is not shown in FIG. 6E for ease of illustration). In accordance with detecting the selection input while the input device is directed to the first physical location, the voxel 630 at the first virtual location is highlighted to indicate that it has been selected. The input device may then be then moved (e.g., swiped, pivoted, swept, or otherwise moved by the user) along a path such that it is directed to a second physical location corresponding to the second virtual location, and then a third physical location corresponding to the third virtual location.

In some examples, in accordance with detecting the movement input, each voxel 630, 632, 634 along the path between the first voxel 630 and the third voxel 634 are highlighted. In some examples, the user may point the input device at each intervening virtual location between a starting virtual location and an ending virtual location to select multiple virtual locations. In some examples, the user may not point the input device at each intervening location between a starting location and an ending location; that is, for example, the user may not swipe the input device across all intervening locations. In some examples, the intervening voxels (e.g., voxel 632) may be highlighted even if they are not explicitly pointed to between the starting location and the ending location.

In some examples, the release input is detected while the input device is directed to the third physical location corresponding to the third virtual location. In accordance with detecting the release input, the (highlighted) first voxel 630, second voxel 632, and third voxel 634 are removed, leaving only the fourth voxel 636. In this manner, a user may remove a group of voxels (e.g., a contiguous group of voxels having adjacent sides, edges, and/or corners) by providing an input that includes a selection input, a movement input, and a release input.

Though not shown, multiple voxels may be deposited (e.g., at the first, second, and third virtual locations) based on similar inputs if the first, second, and third virtual locations are empty when the input is detected. In some examples, if the virtual locations are empty when the input is detected, the virtual locations may optionally be highlighted to indicate where the voxels will be deposited. In some examples, voxels may be deposited if the first selected virtual location is empty, regardless of whether any additional selected virtual locations are empty. In some examples, highlighting that may be used to indicate regions in which voxels may be removed is visually different from highlighting that may be used to indicate regions in which voxels may be deposited, such as by being a different color, transparency, etc.

Although the example depicted in FIG. 6E shows a single row of voxels selected for removal using a first input (e.g., including a selection input, a movement input, and a release input), the disclosure is not so limited, as discussed with reference to FIG. 6H.

Figure 6F:
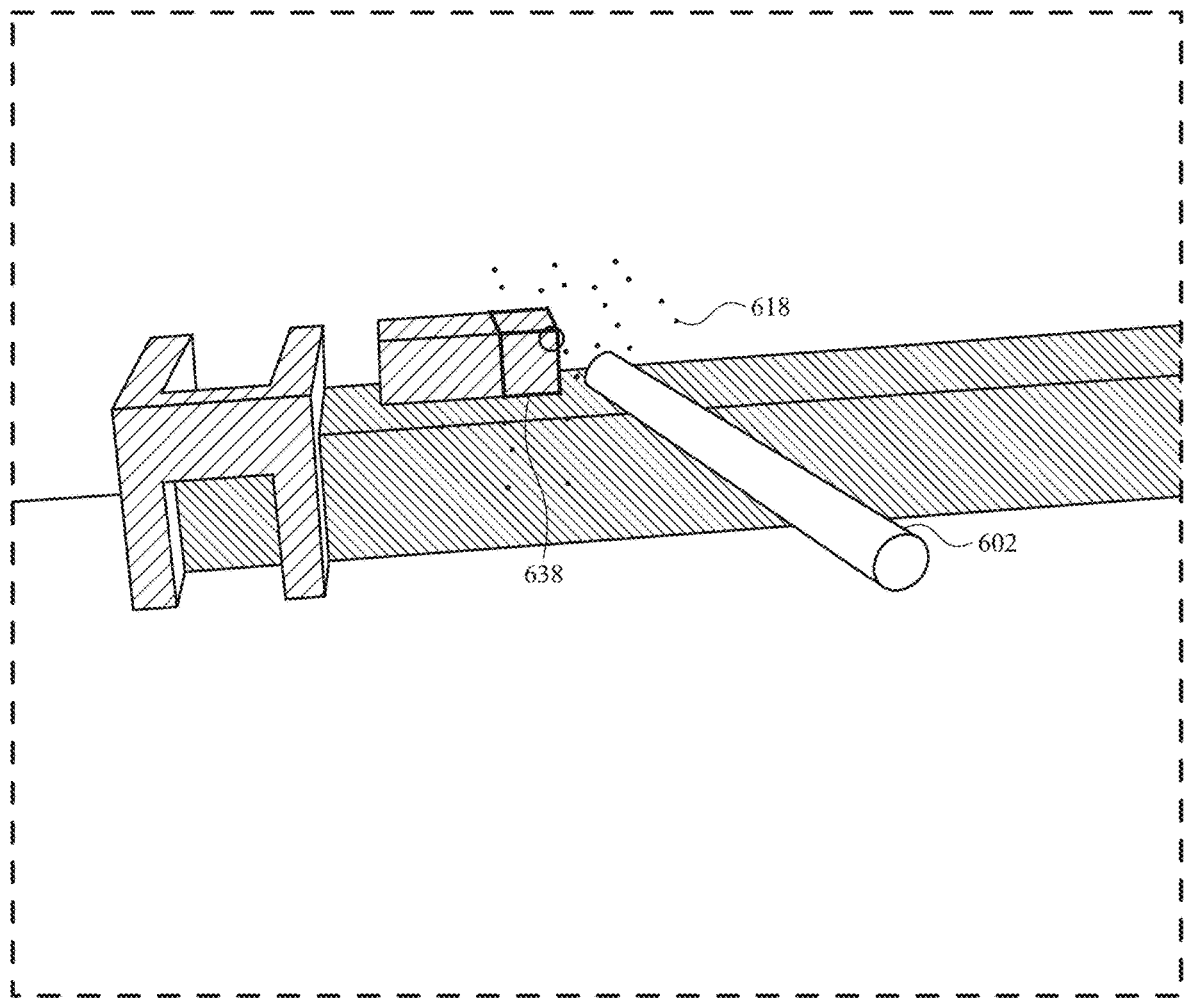
Figure 6G:
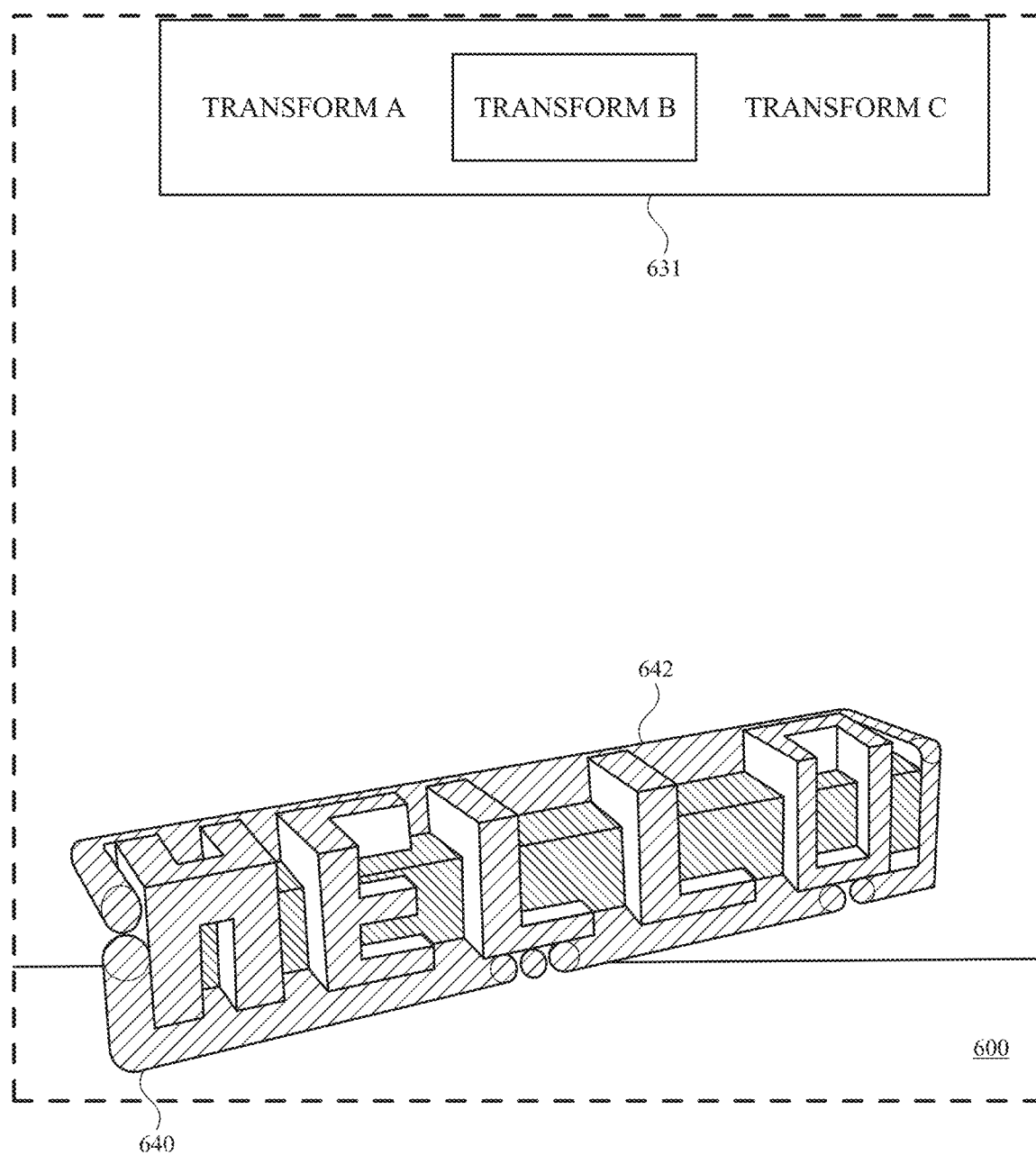

FIG. 6F depicts another example of creating and editing a virtual object using voxels. FIG. 6F depicts computer-generated environment 600, virtual device 602, and preview voxel 638. This example builds on FIG. 6C, which shows depositing voxels based on user interface element 608. In this example, the user has selected user interface element 610, resulting in presentation of preview voxel 638. As shown in FIG. 6F, the user is able to deposit voxels having the visual characteristics of voxel type of preview voxel 638 on and around voxels having the visual characteristics of user interface element 608 to form a multi-dimensional, multi-textured object in the computer-generated environment 600. As shown in FIG. 6G, additional voxels may be deposited to write the text "HELLO" using voxels of the voxel type corresponding to user interface element 610 on two surfaces of the rectangular cuboid of the voxel type corresponding to user interface element 608.

Additionally, the example of FIG. 6G depicts voxels shaped as spheres and tubes (e.g., voxel 640), corresponding to a selection of a spherical user interface element such as user interface element 616. In some examples, spheres may be deposited in response to a tap and release input, and tubes may be deposited in response to a tap and hold during a movement input.

FIG. 6G further depicts manipulation of a voxel representation. In some examples, a second user interface 631 may be presented in the computer-generated environment 600 to enable the user to transform a virtual object 642 comprising voxels, such as by rotating the object, moving (translating) the virtual object in one, two, or three dimensions, and/or scaling the virtual object, among other possibilities. In some examples, a first input device may be used to select user interface elements in a second user interface 631 and perform operations based on selection of the user interface elements. In some examples, a second input device (e.g., hand-tracking sensors, device 200, device 270) may detect an input from a second input source (e.g., a user's hand or eyes, device 260, device 270) that is separate from the first input device and second input device. The input may include a selection input and a movement of the second input source. For example, a second input device may detect a hand raise, a pinch, or another gesture. In accordance with a determination that a Transform A user interface element (e.g., selectable option) is active in the second user interface 631, the voxel representation may be translated in the computer-generated environment in accordance with the movement of the input. In accordance with a determination that a Transform B user interface element (e.g., selectable option) is active in the second user interface, the voxel representation may be rotated in the computer-generated environment in accordance with the movement of the input. In accordance with a determination that a Transform C user interface element (e.g., selectable option) is active in the second user interface, the voxel representation may be scaled (e.g., made bigger or smaller) in the computer-generated environment in accordance with the movement of the input. In this manner, a user may use a first input device and/or hand gestures detected by a third input device (e.g., different than the first input device) to indicate transforms to be performed on a virtual object in the computer-generated environment. This approach may enable a user to, for example, rotate a virtual object using one hand while still holding another input device in the other hand, thereby improving the user experience.

In some examples, the second input source may be used to invoke the second user interface and/or to select an option in the second user interface. In some examples, the second user interface is presented in accordance with a determination that the second input source satisfies one or more criteria. For example, the criteria may include a criterion that is satisfied when a representation of the second input source is visible to the user within the computer-generated environment. The criteria may include a criterion that is satisfied based on a pose, gesture, or motion of the second input source, such as when the second input source is raised, lowered, or makes another type of gesture. Thus, for example, a user may raise their hand to invoke presentation of the second user interface 631.

In some examples, the second input source may be a user's eye or eyes, and the user may select a user interface element in the second user interface 631 by gazing at the user interface element. In this case, the second input device may include eye-tracking features to enable detection and/or tracking of the user's gaze. In some examples, the user may invoke the second user interface by gazing at a portion of the computer-generated environment for a duration of time, such as gazing at a top portion where the second user interface may be presented.

FIG. 6H depicts another example of creating and editing virtual objects using voxels. As shown in FIG. 6H, a user may provide an input for depositing multiple voxels in a region 645 of a virtual grid, such as for depositing a two-dimensional or three-dimensional array of voxels. The input may include a selection input that is detected while the input device is directed to a first physical location corresponding to a first virtual location 648. In some examples, a preview voxel (not shown) may be presented at the first virtual location 648. The input may also include a movement input that is detected when the input device is moved between the first physical location and a second physical location corresponding to a second virtual location 646. The first and second virtual locations 648, 646 may be vertices of the region 645, for example. The input may also include a release input that is detected while the input device is directed to the second physical location corresponding to the second virtual location 646.

In accordance with detecting the input (comprising the selection input, the movement input, and the release input), a plurality of voxels 647 may be deposited in corresponding virtual locations within the region 645. In some examples, in response to the selection input, the first virtual location 646 may be highlighted as an initial (first) representation of a region in which voxels may be deposited. As the virtual device 602 moves between the first virtual location and the second virtual location, the highlighted region may expand to a representation of a second region. When the release input is detected at the second virtual location, the highlighted region may include the entire region shown in FIG. 6H.

In a similar manner, if voxels had previously been deposited in the region (or in a first voxel of the region), such voxels may be removed in accordance with detection of the input described above (e.g., the selection input, movement input, and release input). In some examples, as previously discussed, if voxels had been previously deposited in the region using voxels that are different than the voxels corresponding to the selected preview voxel (e.g., having a different color, shape, texture, etc.), such voxels may not be removed.

In some examples, the selection input for depositing a two-dimensional or three-dimensional array of voxels is different from the selection input user to deposit a single row of voxels. As one example, the selection input for depositing a row of voxels may be a tap (and hold during a movement input before a release input), and the different selection input for depositing an array of voxels may be a double tap (and hold during a movement input before a release input), or the reverse. As another example, the selection input for depositing a row of voxels may be a swipe in a first direction, and the different selection input for depositing an array of voxels may be a swipe in a different direction. In some examples, the selection input and the release input may be the same input; for example, the selection input may be a double tap, and the release input may also be a double tap. A person of skill in the art will recognize that there are many possible inputs that may be used for the selection input and the different selection input.

In some examples, if the different selection input is detected (e.g., a selection input associated with depositing or removing voxels in an array), a representation of a region around the preview voxel may be presented. The representation of the region may include, for example, a color that may be used to indicate a selected region of virtual locations. In some examples, during the movement input, the representation of the region may be expanded in accordance with the movement. That is, as the input device receives the movement input, the representation of the region may expand in the direction(s) of the movement to indicate selection of additional virtual locations. For example, if the second selection input is received while the input device is directed to a first physical location, the representation of the region may initially be presented around a preview voxel at a first virtual location corresponding to the first physical location. As the input device is moved to different physical locations and ends at a second physical location, the representation of the region may expand between the first virtual location and a second virtual location corresponding to the second physical location, thereby becoming a second representation of the region. After detecting a release input, the second representation of the region may cease to be displayed.

In some examples, voxel representations may be created or edited using line editing, plane editing, volume editing, and revolution techniques. Rather than moving each voxel in a particular manner to create a voxel representation, the user can specify a line, plane, volume, and/or contour on which voxels can be arranged. For example, with respect to line editing, based on receiving a selection input used to indicate a starting virtual location at which voxels are to be deposited, a drag input for a virtual line along which voxels are to be deposited after the starting virtual location, and a release input used to indicate an ending virtual location at which the voxels are to be deposited, voxels are displayed arranged along the virtual line in or near real-time. With respect to plane editing, based on receiving a selection input used to indicate a starting virtual location at which voxels are to be deposited, a drag input for a virtual plane along which voxels are to be deposited after the starting virtual location, and a release input used to indicate an ending virtual location at which the voxels are to be deposited, voxels are displayed arranged along the virtual plane in or near real-time. With respect to volume editing, based on receiving a selection input used to indicate a starting virtual location at which voxels are to be deposited, a drag input for a virtual volume along which voxels are to be deposited after the starting virtual location, and a release input used to indicate an ending virtual location at which the voxels are to be deposited, voxels are displayed arranged along the virtual volume in or near real-time. With respect to volume editing, based on receiving a selection input used to indicate a virtual revolution axis on which voxels are to be deposited and a drag input for a virtual contour (e.g., drawn by the user), voxels are displayed arranged along and/or on the virtual contour relative to the virtual revolution axis in or near real-time. For example, a voxel representation of a cone can be generated by revolving a diagonal line relative to a virtual revolution axis.

Figure 7:
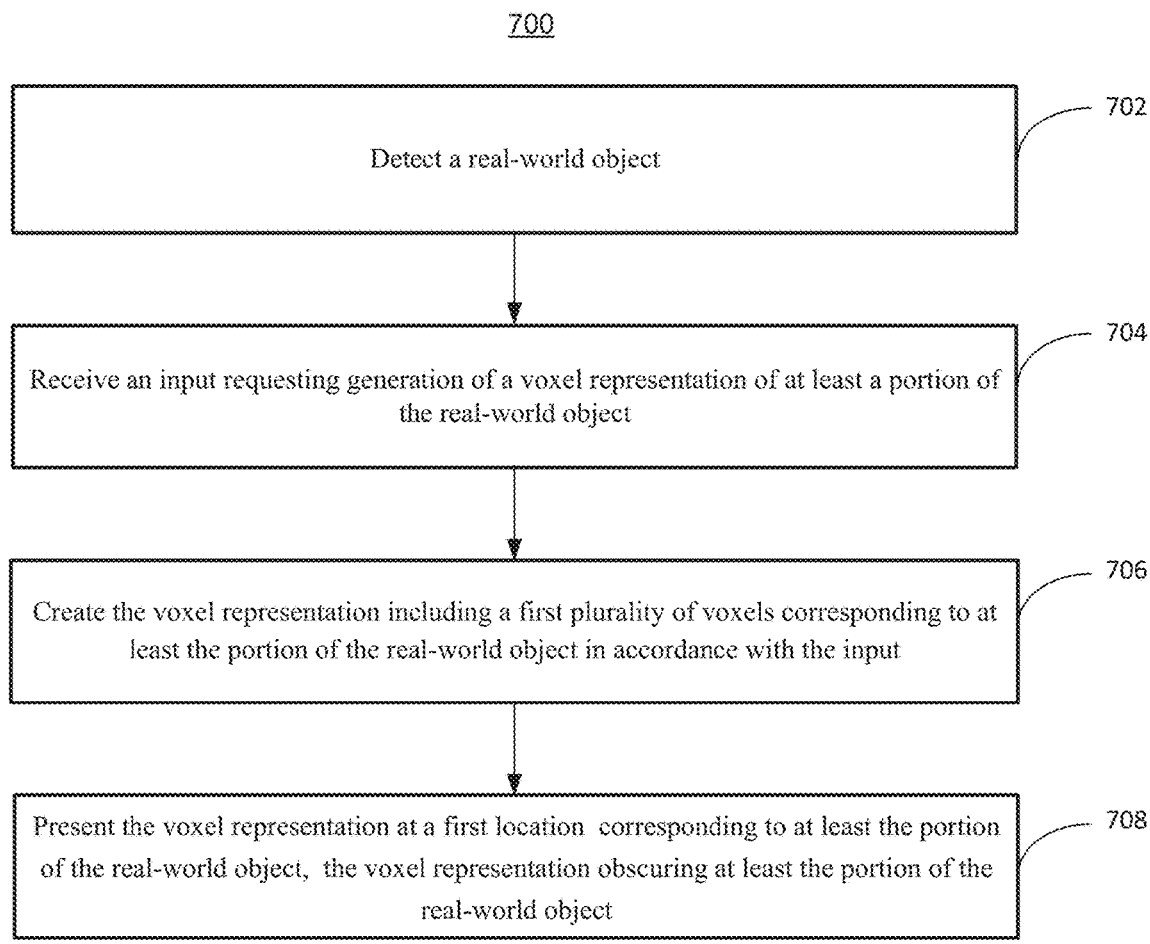
FIG. 7 is a flow chart illustrating an example method for creating and editing virtual objects using voxels in accordance with some examples of the disclosure.

FIG. 7 illustrates an exemplary method 700 for creating a voxel representation based on a real-world object in accordance with some examples of the disclosure. In some examples, the method 700 is performed at an electronic device (e.g., device 200 in FIG. 2A such as a tablet, smartphone, wearable computer, or head mounted device) including a display generation component (e.g., display generation component 214 in FIG. 2A (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some examples, the method 700 is governed by instructions and/or programs that are stored in a non-transitory computer-readable storage medium and that are executed by one or more processors of a computer system, such as the one or more processors 218 of device 200. Some operations in method 700 are optionally combined and/or omitted. In some examples, the order of some operations in method 700 are optionally changed.

In FIG. 7, at block 702, the electronic device optionally detects a real-world object in a three-dimensional environment based on an input device directed towards the real-world object. At block 704, the electronic device optionally receives an input requesting generation of a voxel representation of at least a portion of the real-world object.

At block 706, in accordance with the input, the electronic device optionally creates the voxel representation including a first plurality of voxels corresponding to at least the portion of the real-world object. In some examples, the electronic device can modify and/or animate the voxel representation including a first plurality of voxels based on additional user input. At block 708, the electronic device optionally presents the voxel representation at a first location corresponding to at least the portion of the real-world object, the voxel representation obscuring at least the portion of the real-world object. It should be understood that the particular order of the description of the operations in FIG. 7 is merely exemplary and is not intended to indicate that the described order is the only order in which the operations could be performed. One of ordinary skill in the art would recognize various ways to reorder the operations described herein.

Figure 8:
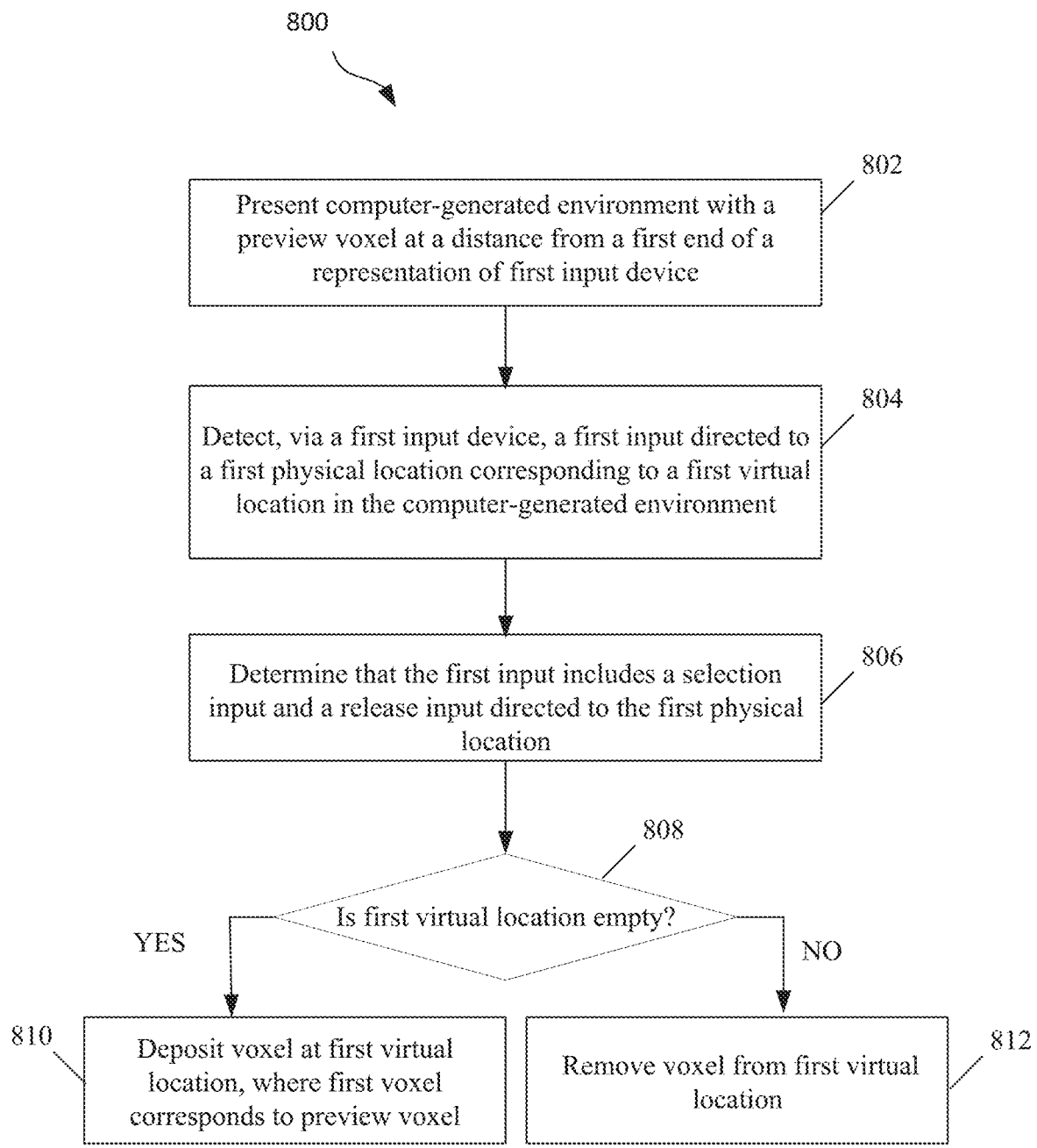
FIG. 8 is a flow chart illustrating an example method for creating and editing virtual objects using voxels in accordance with some examples of the disclosure.

FIG. 8 illustrates an example method 800 for creating and editing virtual objects using voxels, according to some examples of the disclosure. The method 800 can be performed at electronic device 100 of FIG. 1. Some of the operations in method 800 can be optionally combined or omitted, and the order of some operations can be optionally changed. Some of the operations in method 800 can be performed more than once, sequentially, or in parallel.

At block 802, a computer-generated environment is presented. The computer-generated environment includes a preview voxel at a distance from a first end of a representation of a first input device. The preview voxel may be presented as described with reference to FIG. 6A, for example.

At block 804, a first input is detected via the first input device. The first input is directed to a first physical location corresponding to a first virtual location in the computer-generated environment.

At block 806, a determination is made that the first input includes a selection input and a release input directed to the first physical location. The first physical location may correspond to a first virtual location in the computer-generated environment.

At block 808, it is determined whether the first virtual location (corresponding to the first physical location) is empty. That is, it is determined whether a voxel has previously been deposited at the first virtual location.

In accordance with a determination that the first virtual location is empty, at block 810, a voxel is deposited at the first virtual location. In some examples, the voxel corresponds to the preview voxel. That is, the voxel may have the same shape, color, texture, and/or lighting of the preview voxel.

In accordance with a determination that the first virtual location is not empty (e.g., a voxel has previously been deposited at the first virtual location such that the first virtual location contains a voxel), at block 812, the voxel is removed.

In some examples, additionally or alternatively, a real-world object in a three-dimensional environment detected via and a first input requesting generation of a voxel representation of at least a portion of the real-world object can be received via one or more input devices. In some examples, the voxel representation including a first plurality of voxels corresponding to at least the portion of the real-world object in accordance with the first input can be created. In some examples, the voxel representation can be presented in the three-dimensional environment at a first location in the three-dimensional environment corresponding to at least the portion of the real-world object, such that presenting the voxel representation at the first location obscures at least the portion of the real-world object.

In some examples, additionally or alternatively, the voxel representation can be moved from the first location to a second location different than the first location in the three-dimensional environment in response to receiving a second input requesting movement of the voxel representation from the first location to the second location. In some examples, while moving the voxel representation to the second location, at least the first portion of the real-world object at the first location in the three-dimensional environment can be presented.

In some examples, additionally or alternatively, the first plurality of voxels includes three-dimensional geometric shapes.

In some examples, additionally or alternatively, a third input requesting generation of the voxel representation of at least a second portion of the real-world object different than at least the portion of the real-world object can be received. In some examples, additionally or alternatively, the voxel representation can be updated to include a second plurality of voxels different than the first plurality of voxels corresponding to at least the second portion of the real-world object in accordance with the third input.

In some examples, additionally or alternatively, the first plurality of voxels corresponds to a first color, and the second plurality of voxels correspond to a second color different than the first color.

In some examples, additionally or alternatively, the first color is locked from at least the first portion of the real-world object in accordance with the first input and the second color is locked from at least the second portion of the real-world object in accordance with the third input.

In some examples, additionally or alternatively, a second real-world object different than the first real-world object in the three-dimensional environment can be detected, a fourth input requesting generation of a second voxel representation of at least a portion of the second real-world object can be received, and the second voxel representation including a third plurality of voxels corresponding to at least the portion of the second real-world object in accordance with the fourth input can be created.

In some examples, additionally or alternatively, creating the voxel representation includes an animation of the first plurality of voxels correspond to a motion state with a first frequency, such that creating the second voxel representation includes an animation of the second plurality of voxels correspond to a motion state with a second frequency.

In some examples, additionally or alternatively, a resolution of the first plurality of voxels of the voxel representation can be increased in response to detecting the first input directed towards the first plurality of voxels for longer than a threshold amount of time or in response to subsequent input directed toward at least the first portion of the real-world object.

In some examples, additionally or alternatively, detecting, via the one or more input devices, the real-world object includes detecting at least the portion of the real-world object from a first orientation, and wherein the first plurality of voxels corresponds to a first color based on detecting a least the portion of the real-world object from the first orientation.

In some examples, additionally or alternatively, detecting, via the one or more input devices, the real-world object includes detecting at least the portion of the real-world object from a second orientation different than the first orientation, and wherein the first plurality of voxels corresponds to a second color different than the first color based on detecting a least the portion of the real-world object from the second orientation.

In some examples, additionally or alternatively, a three-dimensional representation of the plurality of first voxels corresponding to at least the portion of the real-world object can be presented in response to receiving, via the one or more input devices, the first input requesting generation of the voxel representation of at least the portion of the real-world object.

In some examples, additionally or alternatively, a material, a size, a shape, and/or resolution of a voxel of the first plurality voxels can be adjusted based on a fifth input.

In some examples, additionally or alternatively, a material, a size, a shape, and/or resolution of a voxel of each of the first plurality voxels can be adjusted based on a sixth input different than the fifth input.

In some examples, additionally or alternatively, the first plurality of voxels Includes at least a first sphere corresponding to a first size and at least a second sphere different than the first sphere corresponding to a second size different than the first size.

In some examples, additionally or alternatively, the first plurality of voxels includes spheres in a first position, and the first plurality of voxels can be moved from the first position to a second position different than the first position in accordance with a seventh input corresponding to movement of a first input device at least a threshold number of times over the voxel representation including the first plurality of voxels.

In some examples, additionally or alternatively, an eighth input, via a second input device different than the first input device, requesting manipulation of the voxel representation in accordance with a respective input mode can be received. In some examples, additionally or alternatively, the voxel representation can be manipulated in accordance with the respective input mode corresponding to the eighth input, wherein manipulating the voxel representation includes at least one of translation, rotation, or scaling.

In some examples, additionally or alternatively, at least the portion of the real-world object includes a plurality of colors include a first color and a second color, and the first plurality of voxels corresponds to the first color of the real-world object locked from at least the first portion of the real-world object in accordance with the first input.

In some examples, additionally or alternatively, a size or resolution of the voxel representation including the first plurality of voxels is based on a distance of the one or more input devices from at least the first portion of the real-world object during the first input.

In some examples, additionally or alternatively, a user interface element can be presented at a distance from a first portion of the first input device in the three-dimensional environment, such that the user interface element displays a preview of the voxel representation of portions of the three-dimensional environment corresponding to dimensions of the user interface element.

In some examples, additionally or alternatively, the user interface element moves in the three-dimensional environment in accordance with movement of the first input device.

In some examples, additionally or alternatively, it may be determined that the first input includes a movement input between the selection input and the release input from the first physical location to a second physical location corresponding to a second virtual location, different from the first virtual location. In accordance with a determination that the first virtual location is empty before the first input, a plurality of voxels may be deposited at a corresponding plurality of virtual locations that includes the first virtual location, the second virtual location, and intervening virtual locations. The plurality of voxels may correspond to the preview voxel, such as by having visual characteristics of the preview voxel. In accordance with a determination that the first virtual location is filled with a first voxel before the first input, removing at least the first voxel.

In some examples, additionally or alternatively, it may be determined that the first input includes a different selection input and a movement input between the different selection input and the release input from the first physical location corresponding to the first virtual location to a second physical location corresponding to a second virtual location, different from the first virtual location. In accordance with a determination that the first virtual location is empty before the first input, a region between the first voxel and the second voxel may be filled with a second plurality of voxels corresponding to the preview voxel. The first virtual location and the second virtual location may represent opposite vertices of the region. In accordance with a determination that the first virtual location is filled with a second voxel before the first input is detected, the second voxel may be removed.

In some examples, additionally or alternatively, in accordance with the determination that the first virtual location is filled with the second voxel before the first input is detected, and in accordance with a determination that each of the virtual locations in the region between the first virtual location and the second virtual location are filled with respective voxels, each of the voxels in the region between the first virtual location and the second virtual location may be removed.

In some examples, additionally or alternatively, after the different selection input, a first representation of a region around the preview voxel may be presented at the first virtual location. During the movement input, the first representation of the region may be expanded to a second representation of the region between the first virtual location and the second virtual location. After the release input, second representation of the region may cease to be displayed.

In some examples, additionally or alternatively, a three-dimensional grid of virtual locations may be presented around the representation of the preview voxel. Each virtual location in the three-dimensional grid of virtual locations may represent a location that can be filled with a voxel.

In some examples, additionally or alternatively, the three-dimensional grid of virtual locations may be moved with the preview voxel based on movement of the preview voxel in accordance with movement of the first input device.

In some examples, additionally or alternatively, a first user interface may be displayed, where the first user interface includes a plurality of user interface elements representing a plurality of preview voxels including a first user interface element representing the preview voxel and a second user interface element representing a second preview voxel. A second input may be received via the first input device. The second input may include selecting the second user interface element representing the second preview voxel. The second preview voxel may be presented at the distance from the first end of the first input device in accordance with the second input.

In some examples, additionally or alternatively, while presenting the first user interface, the preview voxel at the distance from the first end of the first input device may cease to be presented.

In some examples, additionally or alternatively, the first user interface may be presented in response to a third input detected via the first input device directed at the representation of the preview voxel.

In some examples, additionally or alternatively, a second end of the first input device, opposite the first end, includes a representation of the preview voxel.

In some examples, additionally or alternatively, a second user interface may be displayed. The second user interface may include a plurality of user interface elements representing options for translating, rotating, or scaling a virtual object comprising one or more voxels created by the first input device. A fourth input may be received via a second input source different than the first input device. The fourth input may include a selection input and a movement input. In accordance with a determination that a translating option is active in the second user interface, the virtual object may be translated in the three-dimensional environment in accordance with the movement input. In accordance with a determination that a rotating option is active in the second user interface, the virtual object may be rotated in the three-dimensional environment in accordance with the movement input. In accordance with a determination that a scaling option is active in the second user interface, the virtual object may be scaled in the three-dimensional environment in accordance with the movement input.

In some examples, additionally or alternatively, the second input source may be detected via a second input device, where the second user interface is displayed in accordance with a determination that the second input source satisfies one or more criteria.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A method comprising:
   at an electronic device in communication with a display and one or more input devices including a first input device:
   presenting, via the display, a computer-generated environment comprising a preview voxel at a distance from a first end of a representation of the first input device;
   detecting, via the first input device, a first input directed to a first physical location corresponding to a first virtual location in the computer-generated environment; and
   in accordance with a determination that the first input includes a selection input and a release input directed to the first physical location:
   in accordance with a determination that the first virtual location is empty before detecting the first input, depositing a first voxel at the first virtual location, the first voxel corresponding to the preview voxel; and
   in accordance with a determination that the first virtual location is filled with a second voxel before detecting the first input, removing the second voxel.

2. The method of claim 1, further comprising:
   in accordance with a determination that the first input includes a movement input between the selection input and the release input from the first physical location to a second physical location corresponding to a second virtual location, different from the first virtual location:
   in accordance with a determination that the first virtual location is empty before the first input, depositing a plurality of voxels at a corresponding plurality of virtual locations comprising the first virtual location, the second virtual location, and intervening virtual locations, wherein the plurality of voxels corresponds to the preview voxel; and
   in accordance with a determination that the first virtual location is filled with the first voxel before the first input, removing at least the first voxel.

3. The method of claim 1, further comprising:
   in accordance with a determination that the first input includes a different selection input and a movement input between the different selection input and the release input from the first physical location corresponding to the first virtual location to a second physical location corresponding to a second virtual location, different from the first virtual location:
   in accordance with a determination that the first virtual location is empty before the first input, filling voxels in a region between the first voxel and the second voxel with a second plurality of voxels corresponding to the preview voxel, wherein the first virtual location and the second virtual location represent opposite vertices of the region; and
   in accordance with a determination that the first virtual location is filled with the second voxel before the first input is detected, removing at least the second voxel.

4. The method of claim 3, further comprising:
   in accordance with the determination that the first virtual location is filled with the second voxel before the first input is detected, and in accordance with a determination that virtual locations in a region between the first virtual location and the second virtual location are filled with respective voxels, removing each of the voxels in the region between the first virtual location and the second virtual location, wherein removing the at least the second voxel comprises removing each of the voxels in the region between the first virtual location and the second virtual location.

5. The method of claim 3, further comprising:
after the different selection input, presenting a first representation of a region around the preview voxel at the first virtual location;
during the movement input, expanding the first representation of the region to a second representation of the region between the first virtual location and the second virtual location; and
after the release input, ceasing displaying the second representation of the region.

6. The method of claim 1, further comprising:
presenting a three-dimensional grid of virtual locations around the representation of the preview voxel, wherein each virtual location in the three-dimensional grid of virtual locations represents a location that can be filled with a voxel.

7. The method of claim 6, further comprising moving the three-dimensional grid of virtual locations with the preview voxel based on movement of the preview voxel in accordance with movement of the first input device.

8. An electronic device, comprising:
a display, wherein the electronic device is in communication with one or more input devices including a first input device; and
the electronic device further comprising one or more processors configured to:
present, via the display, a computer-generated environment comprising a preview voxel at a distance from a first end of a representation of the first input device;
detect, via the first input device, a first input directed to a first physical location corresponding to a first virtual location in the computer-generated environment; and
in accordance with a determination that the first input includes a selection input and a release input directed to the first physical location:
in accordance with a determination that the first virtual location is empty before detecting the first input, deposit a first voxel at the first virtual location, the first voxel corresponding to the preview voxel; and
in accordance with a determination that the first virtual location is filled with a second voxel before detecting the first input, remove the second voxel.

9. The electronic device of claim 8, the one or more processors further configured to:
display a first user interface comprising a plurality of user interface elements representing a plurality of preview voxels including a first user interface element representing the preview voxel and a second user interface element representing a second preview voxel;
receive, via the first input device, a second input selecting the second user interface element representing the second preview voxel; and
present the second preview voxel at the distance from the first end of the representation of the first input device in accordance with the second input.

10. The electronic device of claim 9, the one or more processors further configured to:
while displaying the first user interface, cease presenting the preview voxel at the distance from the first end of the representation of the first input device.

11. The electronic device of claim 9, the one or more processors further configured to:
present the first user interface in response to a third input detected via the first input device directed at the representation of the preview voxel.

12. The electronic device of claim 8, wherein a second end of the representation of the first input device, opposite the first end, includes a representation of the preview voxel.

13. The electronic device of claim 8, the one or more processors further configured to:
display a second user interface comprising a plurality of user interface elements representing options for translating, rotating, or scaling a virtual object comprising one or more voxels created by the first input device;
receive, via a second input source different than the first input device, a fourth input including a selection input and a movement input;
in accordance with a determination that a translating option is active in the second user interface, translate the virtual object in the computer-generated environment in accordance with the movement input;
in accordance with a determination that a rotating option is active in the second user interface, rotate the virtual object in the computer-generated environment in accordance with the movement input; and
in accordance with a determination that a scaling option is active in the second user interface, scale the virtual object in the computer-generated environment in accordance with the movement input.

14. The electronic device of claim 13, the one or more processors further configured to:
detect the second input source via a second input device, wherein the second user interface is displayed in accordance with a determination that the second input source satisfies one or more criteria.

15. A non-transitory computer readable storage medium storing one or more programs, the one or more programs comprising instructions, which when executed by one or more processors of an electronic device in communication with a display and one or more input devices including a first input device, cause the electronic device to:
present, via the display, a computer-generated environment comprising a preview voxel at a distance from a first end of a representation of the first input device;
detect, via the first input device, a first input directed to a first physical location corresponding to a first virtual location in the computer-generated environment; and
in accordance with a determination that the first input includes a selection input and a release input directed to the first physical location:
in accordance with a determination that the first virtual location is empty before detecting the first input, deposit a first voxel at the first virtual location, the first voxel corresponding to the preview voxel; and
in accordance with a determination that the first virtual location is filled with a second voxel before detecting the first input, remove the second voxel.

16. The non-transitory computer readable storage medium of claim 15, wherein the instructions, when executed, further cause the electronic device to:
in accordance with a determination that the first input includes a movement input between the selection input and the release input from the first physical location to a second physical location corresponding to a second virtual location, different from the first virtual location:
  in accordance with a determination that the first virtual location is empty before the first input, deposit a plurality of voxels at a corresponding plurality of virtual locations comprising the first virtual location, the second virtual location, and intervening virtual locations, wherein the plurality of voxels corresponds to the preview voxel; and
  in accordance with a determination that the first virtual location is filled with a first voxel before the first input, remove at least the first voxel.

17. The non-transitory computer readable storage medium of claim 15, wherein the instructions, when executed, further cause the electronic device to:
  in accordance with a determination that the first input includes a different selection input and a movement input between the different selection input and the release input from the first physical location corresponding to the first virtual location to a second physical location corresponding to a second virtual location, different from the first virtual location:
    in accordance with a determination that the first virtual location is empty before the first input, fill voxels in a region between the first voxel and the second voxel with a second plurality of voxels corresponding to the preview voxel, wherein the first virtual location and the second virtual location represent opposite vertices of the region; and
    in accordance with a determination that the first virtual location is filled with a second voxel before the first input is detected, remove at least the second voxel.

18. The non-transitory computer readable storage medium of claim 17, wherein the instructions, when executed, further cause the electronic device to:
  in accordance with the determination that the first virtual location is filled with the second voxel before the first input is detected, and in accordance with a determination that virtual locations in a region between the first virtual location and the second virtual location are filled with respective voxels, remove each of the voxels in the region between the first virtual location and the second virtual location, wherein removing the at least the second voxel comprises removing each of the voxels in the region between the first virtual location and the second virtual location.

19. The non-transitory computer readable storage medium of claim 17, wherein the instructions, when executed, further cause the electronic device to:
  after the different selection input, present a first representation of a region around the preview voxel at the first virtual location;
  during the movement input, expand the first representation of the region to a second representation of the region between the first virtual location and the second virtual location; and
  after the release input, cease displaying the second representation of the region.

20. The non-transitory computer readable storage medium of claim 15, wherein the instructions, when executed, further cause the electronic device to:
  present a three-dimensional grid of virtual locations around the representation of the preview voxel, wherein each virtual location in the three-dimensional grid of virtual locations represents a location that can be filled with a voxel.

* * * * *